United States Patent
Gage et al.

(10) Patent No.: US 10,893,568 B2
(45) Date of Patent: Jan. 12, 2021

(54) LOCATION AND CONTEXT MANAGEMENT IN A RAN INACTIVE MODE

(71) Applicant: Huawei Technologies Co., Ltd., Shenzhen (CN)

(72) Inventors: William Anthony Gage, Stittsville (CA); Nathan Edward Tenny, Portland, OR (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/103,286

(22) Filed: Aug. 14, 2018

(65) Prior Publication Data

US 2019/0059128 A1 Feb. 21, 2019

Related U.S. Application Data

(60) Provisional application No. 62/547,452, filed on Aug. 18, 2017.

(51) Int. Cl.
*H04W 4/00* (2018.01)
*H04W 76/27* (2018.01)
(Continued)

(52) U.S. Cl.
CPC .......... *H04W 76/27* (2018.02); *H04L 9/088* (2013.01); *H04L 9/0844* (2013.01);
(Continued)

(58) Field of Classification Search
None
See application file for complete search history.

(56) References Cited

U.S. PATENT DOCUMENTS

| 2011/0258445 A1* | 10/2011 | Escott ............... H04W 12/0401 713/168 |
| 2012/0129529 A1 | 5/2012 | Deng et al. |

(Continued)

FOREIGN PATENT DOCUMENTS

| CN | 101998619 A | 3/2011 |
| CN | 102835136 A | 12/2012 |

(Continued)

OTHER PUBLICATIONS

3GPP TS 33.501 V0.3.0 (Aug. 2017), 3rd Generation Partnership Project; Technical Specification Group Services and System Aspects; Security Architecture and Procedures for 5G System (Release 15).

(Continued)

*Primary Examiner* — Zewdu A Beyen

(57) ABSTRACT

A method at a network node of a radio access network (RAN) for managing a context of a user equipment (UE) operating in an inactive mode, the method comprising: receiving, from a second network node, a context retrieval request comprising a UE identifier and a first message, the first message being protected with a first cryptographic key; validating the first message using a stored cryptographic key associated with a UE context indicated by the UE identifier; and sending a context retrieval response message to the second network node containing a relocation indication of whether the UE context is to be relocated to the second network node.

12 Claims, 18 Drawing Sheets

(51) Int. Cl.

| | | |
|---|---|---|
| *H04L 9/08* | (2006.01) | |
| *H04W 12/06* | (2009.01) | |
| *H04W 76/30* | (2018.01) | |
| *H04W 76/10* | (2018.01) | |
| *H04W 12/04* | (2009.01) | |
| *H04W 52/02* | (2009.01) | |

(52) U.S. Cl.
CPC ....... *H04W 12/04* (2013.01); *H04W 12/0609* (2019.01); *H04W 52/0206* (2013.01); *H04W 76/10* (2018.02); *H04W 76/30* (2018.02); *H04L 9/0819* (2013.01); *H04L 2209/80* (2013.01)

(56) References Cited

U.S. PATENT DOCUMENTS

| | | | |
|---|---|---|---|
| 2015/0121490 A1* | 4/2015 | Liu .................. | H04W 12/0401 726/6 |
| 2017/0012947 A1 | 1/2017 | Lee et al. | |

FOREIGN PATENT DOCUMENTS

| | | |
|---|---|---|
| CN | 103338489 A | 10/2013 |
| CN | 104322089 A | 1/2015 |
| EP | 2645806 A1 | 10/2013 |
| EP | 2840817 A1 | 2/2015 |
| WO | 2011150808 A1 | 12/2011 |
| WO | 2014127797 A1 | 8/2014 |
| WO | 2016089349 A1 | 6/2016 |

OTHER PUBLICATIONS

3GPP TS 38.300 V0.6.0 (Aug. 2017), 3rd Generation Partnership Project; Technical Specification Group Radio Access Network;NR; NR and NG-RAN Overall Description; Stage 2 (Release 15).

3GPP TS 38.321 V0.1.0 (Jun. 2017), 3rd Generation Partnership Project; Technical Specification Group Radio Access Network; NR; Medium Access Control (MAC) protocol specification (Release 15).

3GPP TS 38.323 V0.2.1 (Aug. 2017), 3rd Generation Partnership Project; Technical Specification Group Radio Access Network; NR; Packet Data Convergence Protocol (PDCP) specification (Release 15).

3GPP TS 38.331 V0.0.5 (Aug. 2017), 3rd Generation Partnership Project; Technical Specification Group Radio Access Network; NR; Radio Resource Control (RRC); Protocol specification (Release 15).

3GPP TS 38.423 V0.1.1 (Jun. 2017), 3rd Generation Partnership Project; Technical Specification Group Radio Access Network; NG Radio Access Network (NG-RAN); Xn application protocol (XnAP) (Release 15).

Nokia et al,"Aspects for direct data transmission in new NR state", 3GPP TSG-RAN WG2 Meeting NR Ad Hoc, R2-1700108, Jan. 17-19, 2017, 6 pages, Spokane, USA.

ZTE, "Considertion on periodic RAN area update procedure", 3GPP TSG-RAN WG2 Meeting#99, R2-1708156, Aug. 21-25, 2017, 5 pages, Berlin, Germany.

* cited by examiner

LOCATION AND CONTEXT MANAGEMENT IN A RAN INACTIVE MODE

RELATED APPLICATION

The present disclosure is related to US Provisional Patent Application No. 62/547,452 entitled "Location and Context Management in a RAN INACTIVE Mode" filed 18 Aug. 2017, the contents of which are incorporated by reference, inclusive of all filed appendices.

TECHNICAL FIELD

The present disclosure generally pertains to the field of wireless communications networks, and particular embodiments or aspects relate to location and context management in a RAN INACTIVE mode of operation.

BACKGROUND

In a conventional radio access network (RAN), a user equipment (UE) may be operating in any one of a CONNECTED mode, an IDLE mode, and an INACTIVE mode. The CONNECTED mode corresponds with bi-directional connectivity between the UE and its serving base stations, such that the UE is able to send and receive session protocol data units (PDUs). The IDLE mode corresponds with no radio resource control (RRC) connection (and therefore no radio connectivity) between the UE and the RAN, and the RAN releases any RAN resources associated with the UE. The INACTIVE mode is similar to the IDLE mode in that there is no RRC connection between the UE and the RAN and there are no radio resources allocated to the UE, but also differs from the IDLE mode in that at least one RAN node retains UE context information (such as security association, encryption keys etc.), and so is capable of initiating communication with the UE in a relatively short period of time.

The INACTIVE mode allows a UE to enter a low energy mode of operation, and thereby conserve battery power. In order to receive information transmitted by the network, the UE transitions from the INACTIVE mode into the CONNECTED mode.

However a transition from the INACTIVE mode to the CONNECTED mode results in one or more of the following:

- moving UE context across a backhaul network to the new serving RAN node from an anchor RAN node;
- creating a new security association between the UE and the new serving RAN node and deriving new cryptographic keys;
- control plane signalling over the radio link to configure the UE for operation within the new serving cell.

These operations result in additional latency and extended periods of time when the UE is not able to re-enter a low energy mode of operation due to the expected interaction with the serving RAN node. Therefore the anchor RAN node should be able to decide whether to retain its role of anchor for a UE or to relocate the role of anchor to the new serving RAN node.

When the UE initiates a transition from the INACTIVE to the CONNECTED mode or initiates a RAN location notification and/or a RAN notification area (RNA) update in INACTIVE mode, current procedures do not fully protect the control plane signalling between the UE and the RAN and delay validation of the UE which potentially results in significant network signalling and processing, if validation subsequently fails.

Accordingly, there may be a need for a system and method for location and context management in a RAN INACTIVE mode that is not subject to one or more limitations of the prior art.

This background information is intended to provide information that may be of possible relevance to the present disclosure. No admission is necessarily intended, nor should be construed, that any of the preceding information constitutes prior art against the present disclosure.

SUMMARY

It is an object of the present disclosure to obviate or mitigate at least one disadvantage of the prior art.

Accordingly, a first aspect of the present disclosure provides an anchor node of a RAN, the anchor node comprising: a memory and at least one processor configured to: receive, from a second network node, a context retrieval request comprising an identifier of a UE operating in an INACTIVE mode and a first message, the first message being protected with a first cryptographic key; validate the first message using a stored cryptographic key associated with a UE context indicated by the identifier of the UE; and send a context retrieval response to the second network node, the context retrieval response containing a relocation indication of whether the UE context is to be relocated to the second network node.

In an embodiment, the relocation indication is responsive to validating the first message in accordance with the stored cryptographic key.

In an embodiment, the relocation indication is responsive to a determination of whether to relocate the UE context to the second network node.

In an embodiment, the context retrieval response can comprise a second message protected with a second cryptographic key.

In an embodiment, the second message can be a radio resource control (RRC) message.

In an embodiment, the second message can comprise at least one of: an identifier to be used by the UE for further operations in the INACTIVE mode; an indication of an RNA where the UE can receive service while operating in the INACTIVE mode; and a maximum time between location notifications initiated by the UE.

In an embodiment, the context retrieval response can comprise the UE context and a second cryptographic key.

A further aspect of the present disclosure provides a serving node of a RAN, the serving node comprising: a memory and at least one processor configured to: receive, from a UE, an identifier of a UE operating in an INACTIVE mode and a first message, the first message being protected with a first cryptographic key; send the identifier of the UE and the first message to a second network node; receive, from the second network node, a second message protected with a second cryptographic key; and send the second message to the UE.

In an embodiment, the second network node can be determined in accordance with the identifier of the UE.

In an embodiment, the second message can comprise at least one of: an identifier to be used by the UE for further operations in the INACTIVE mode; an indication of an RNA where the UE can receive service while operating in the INACTIVE mode; and a maximum time between location notifications initiated by the UE.

A further aspect of the present disclosure provides a serving node of a RAN, the serving node comprising: a memory and at least one processor configured to: receive, from a UE, an identifier of a UE operating in an INACTIVE mode and a first message, the first message being protected with a first cryptographic key; send the identifier of the UE and the first message to a second network node; receive from the second network node, a context associated with the UE; derive, based on the context, a second cryptographic key; and send a second message to the UE protected with the second cryptographic key.

In an embodiment, the second network node can be determined in accordance with the identifier of the UE.

In an embodiment, the second message can comprise any one or more of: an identifier to be used by the UE for further operations in the INACTIVE mode; an indication of an RNA where the UE can receive service while operating in the INACTIVE mode; and a maximum time between location notifications initiated by the UE.

BRIEF DESCRIPTION OF THE FIGURES

Further features and advantages of the present disclosure will become apparent from the following detailed description, taken in combination with the appended drawings, in which.

DETAILED DESCRIPTION

In the following description, features of the present disclosure are described by way of examples. For convenience of description, these examples make use of features and terminology known from 4G and 5G networks as defined by the Third Generation Partnership Project (3GPP). However, it shall be understood that the present disclosure is not limited to such networks. Rather, methods and systems in accordance with the present disclosure may be implemented in any network in which a mobile device may connect to the network through at least one access point, and subsequently be handed-over to at least one other access point during the course of a communications session.

Figure 1:
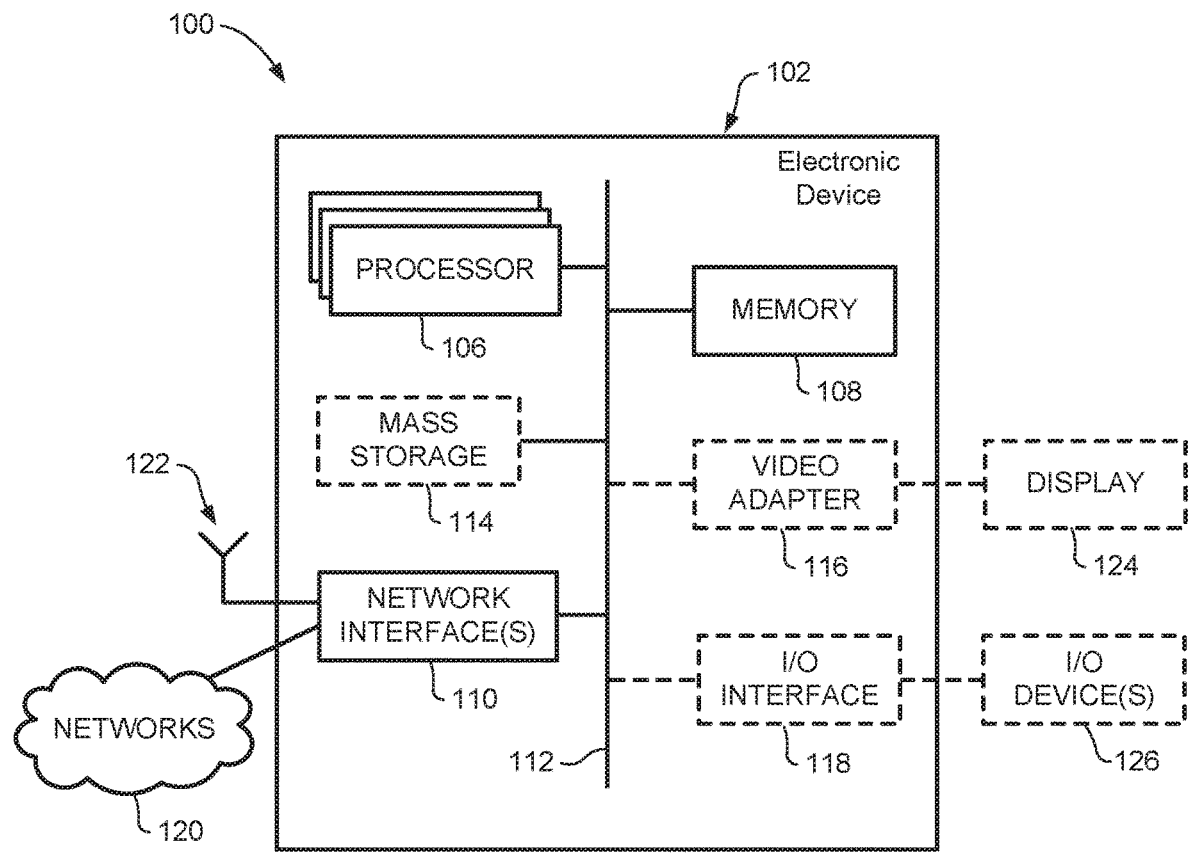
FIG. 1 is a block diagram of an electronic device within a computing and communications environment that may be used for implementing devices and methods in accordance with representative examples of the present disclosure.

FIG. 1 is a block diagram of an electronic device (ED) 102 illustrated within a computing and communications environment 100 that may be used for implementing the devices and methods disclosed herein. In some examples, the ED 102 may be an element of communications network infrastructure, such as a base station (for example a NodeB, an enhanced Node B (eNB), a next generation NodeB (sometimes referred to as ng-eNB or gNB), a home subscriber server (HSS), a gateway (GW) such as a packet gateway (PGW) or a serving gateway (SGW) or a user plane gateway (UPGW), a user plane function (UPF), or various other nodes or functions within a CN. In other examples, the ED 102 may be a device that couples to network infrastructure over a radio interface, such as a mobile phone, smart phone or other such wireless device that may be classified as a UE. In some examples, ED 102 may be a Machine Type Communications (MTC) device (also referred to as a machine-to-machine (m2m) device), or another such device that may be categorized as a UE 102 despite not providing a direct service to a user. In some references, an ED 102 may also be referred to as a mobile device (MD), a term intended to reflect devices that couple to a mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The ED 102 typically includes a processor 106, such as a Central Processing Unit (CPU), and may further include specialized processors such as a Graphics Processing Unit (GPU) or other such processor, a memory 108, a network interface 110 and a bus 112 to couple the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific examples, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The ED 102 may also include one or more network interfaces 110, which may include at least one of a wired network interface and a wireless network interface. As illustrated in FIG. 1, network interface 110 may include a wired network interface to couple to a network 120, and also may include a radio access network interface 122 for connecting to other devices over a radio link. When ED 102 is network infrastructure, the radio access network interface 122 may be omitted for nodes or functions acting as elements of the CN other than those at the radio edge (e.g. an eNB). When ED 102 is infrastructure at the radio edge of a network, both wired and wireless network interfaces may be included. When ED 102 is a wirelessly connected device, such as a UE, radio access network interface 122 may be present and it may be supplemented by other wireless interfaces such as WiFi network interfaces. The network interfaces 110 allow the ED 102 to communicate with remote entities such as those coupled to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some examples, mass storage 114 may be remote to the ED 102 and accessible through use of a network interface such as interface 110. In the illustrated example, mass storage 114 is distinct from memory 108 where it is included, and may generally perform storage tasks compatible with higher latency, but may generally provide lesser or no volatility. In some examples, mass storage 114 may be integrated with a memory 108 to form an heterogeneous memory.

The optional video adapter 116 and the I/O interface 118 (shown in dashed lines) provide interfaces to couple the ED 102 to external input and output devices. Examples of input and output devices include a display 124 coupled to the video adapter 116 and an I/O device 126 such as a touch-screen coupled to the I/O interface 118. Other devices may be coupled to the ED 102, and additional or fewer interfaces may be utilized. For example, a serial interface such as Universal Serial Bus (USB) (not shown) may be used to provide an interface for an external device. Those skilled in the art will appreciate that in examples in which ED 102 is part of a data center, I/O interface 118 and Video Adapter 116 may be virtualized and provided through network interface 110.

In some examples, ED 102 may be a standalone device, while in other examples, ED 102 may be resident within a data center. A data center, as will be understood in the art, is a collection of computing resources (typically in the form of servers) that can be used as a collective computing and storage resource. Within a data center, a plurality of servers can be coupled together to provide a computing resource pool upon which virtualized entities can be instantiated. Data centers can be interconnected with each other to form networks consisting of pools computing and storage resources coupled to each by connectivity resources. The connectivity resources may take the form of physical connections such as Ethernet or optical communications links, and may include wireless communication channels as well. If two different data centers are coupled by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of coupled data centers or other collection of nodes are sliced, different network slices can be created.

Figure 2:
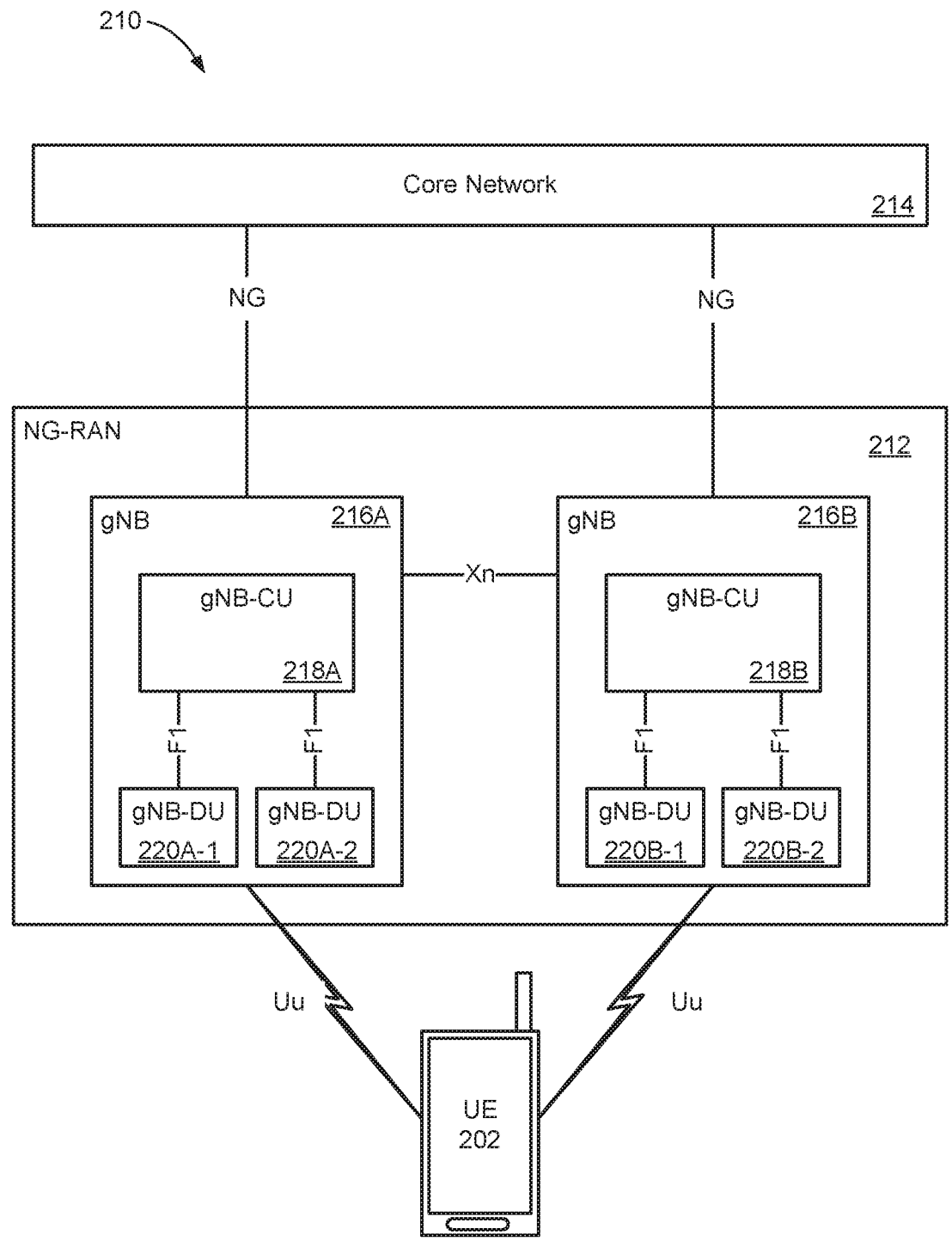
FIG. 2 is a block diagram illustrating an example architecture of a 5G radio access network.

FIG. 2 illustrates an architecture 210 for the implementation of a 5G next generation radio access network (NG-RAN) 212. NG-RAN 212 couples a UE 202 to a CN 214. Those skilled in the art will appreciate that CN 214 may be a 5G Core Network or a 4 G Evolved Packet Core (EPC) network. Nodes within NG-RAN 212 couple to the 5G CN 214 over an NG interface. This NG interface can comprise both a control plane (CP) NG-C (N2) interface to a CN CP function (CPF) and a user plane (UP) NG-U (N3) interface to a CN UP function (UPF). NG-RAN 212 includes a plurality of radio access nodes where each node is referred to as a gNB. In the NG-RAN 212, gNB 216A and gNB 216B are able to communicate with each other over an Xn interface. Within a single gNB 216A, the functionality of the gNB may be decomposed into a centralized unit (gNB-CU) 218A and a set of distributed units (gNB-DU 220A-1 and gNB-DU 220A-2, collectively referred to as 220A). gNB-CU 218A is coupled to a gNB-DU 220A over an F1 interface. Similarly gNB 216B has a gNB-CU 218B coupling to a set of distributed units gNB-DU 220B-1 and gNB-DU 220B. Each gNB-DU may be responsible for one or more cells providing radio coverage within the public land mobile network (PLMN).

A gNB is also coupled to UE 202 (such as, for example ED 102) via a radio link (Uu) and to another gNB via an Xn interface that includes both a CP component (Xn-C) and a UP component (Xn-U).

A UE 202 may establish multiple PDU sessions with the CN 214 where different sessions may correspond to different instances of the NG-U UP interface; each instance of the NG-U interface may terminate on a different CN UPF.

In a 3GPP Long-Term Evolution (LTE) system, similar interfaces exist: an eNB is coupled to a CN 214 through an S1 interface and to another eNB through an X2 interface. Throughout this document, the term "RAN node" is used to refer to a RAN element that encompasses gNB, gNB-CU, gNB-DU, eNB, ng-eNB, ng-eNB-CU, ng-eNB-DU, NodeB, base station, and other forms of radio access controller. The term "RAN node" may also be understood in some contexts to include other wireless access nodes, such as WiFi access points, in which case suitable modifications to adapt to a different standard may be required.

It should be understood that any or all of the functions discussed above with respect to the NG-RAN 212 and CN 214 may be virtualized within a network, and the network itself may be provided as a network slice of a larger resource pool.

Figure 3:
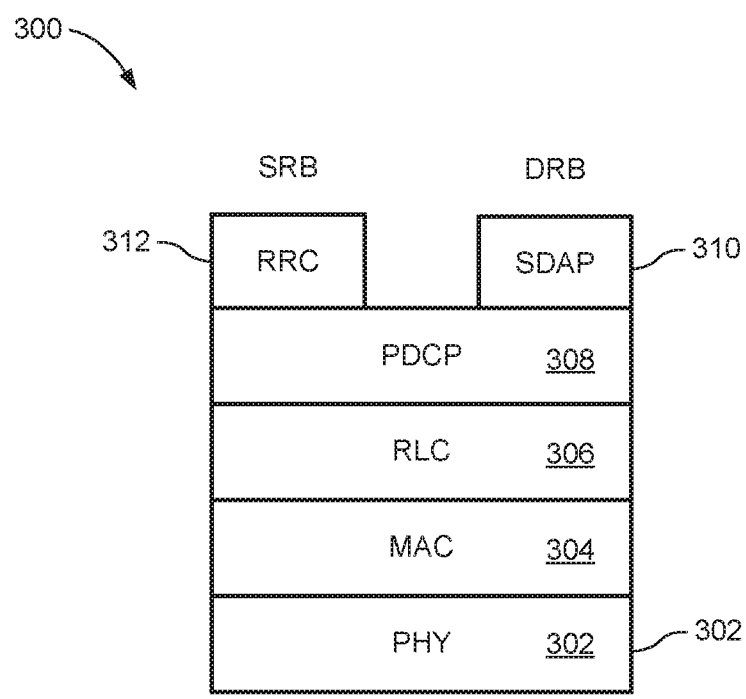
FIG. 3 is a block diagram illustrating a radio link protocol stack usable in examples of the present disclosure.

Referring to FIG. 3, the Uu interface between a UE 202 and a RAN node may comprise several entities within the protocol stack 300. Example entities include physical layer (PHY) 302, medium access control (MAC) 304, radio link control (RLC) 306, packet data convergence protocol (PDCP) layer 308, service data adaptation protocol (SDAP) layer 310, and radio resource control (RRC) layer 312.

CP information such as RRC 312 and non-access stratum (NAS) signalling may be carried over a signalling radio bearer (SRB) while UP data may be carried over a data radio bearer (DRB).

Figures 4A, 4B:
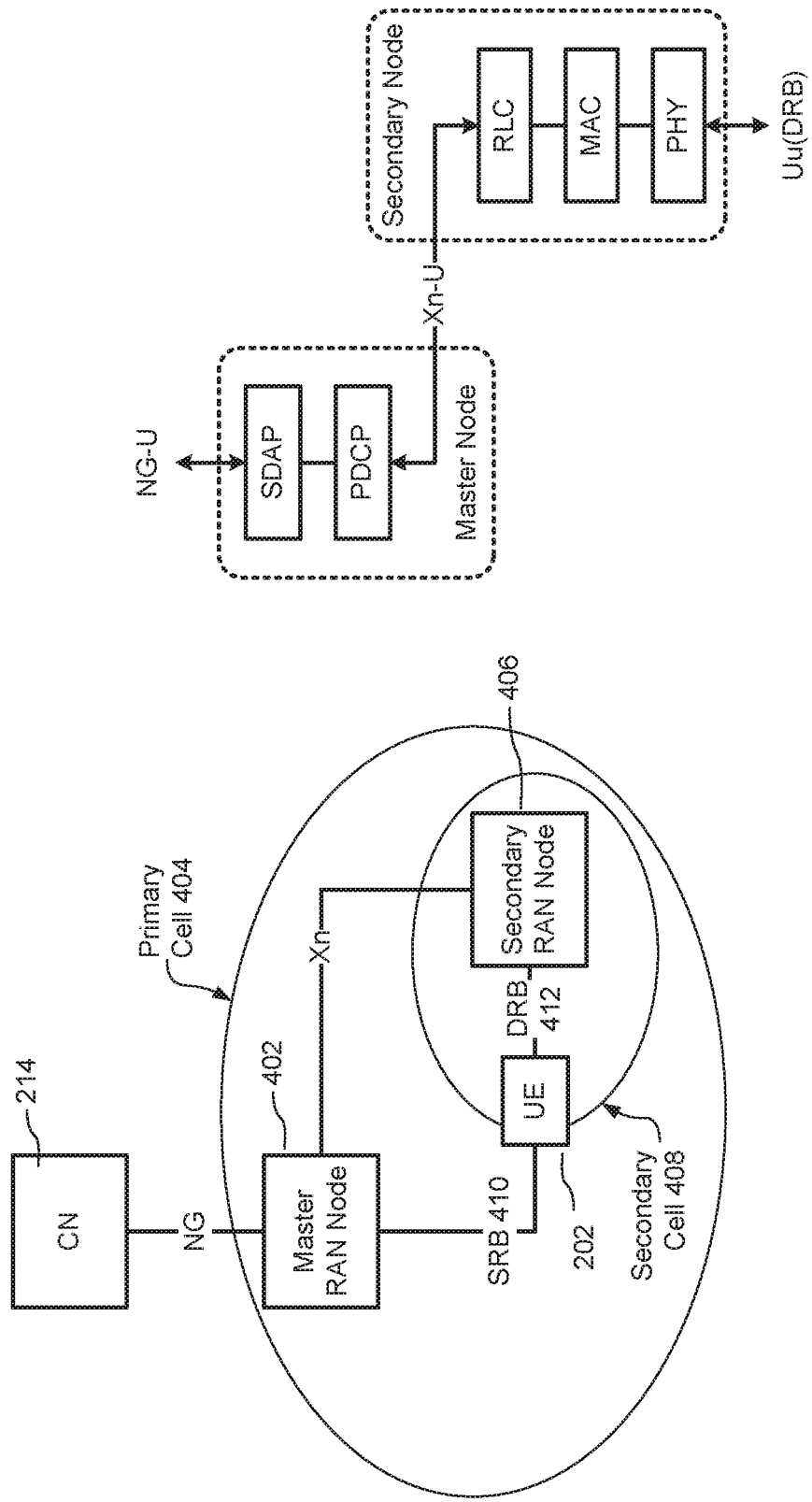
FIG. 4A is a block diagram illustrating dual connectivity.
FIG. 4B is a block diagram illustrating a protocol stack for the dual connectivity of FIG. 4A.

In some networks, a number of small cells may be deployed within the coverage area of a macro cell to offload traffic from the macro cell and/or to provide improved signal quality to UEs. FIG. 4A shows an example deployment in which a master RAN node 402 provides the NG connections to the CN 214 and maintains an SRB 410 to a UE 202 through a primary cell 404. The UE 202 may use a DRB 412 to convey UP traffic through a secondary cell 408 to a secondary RAN node 406. This traffic may be relayed between the master 402 and the secondary 406 RAN nodes over an Xn interface.

On the network side, the UP protocol stack in a dual connectivity deployment may be split between the master RAN node 402 and the secondary RAN node 406, as may be seen in FIG. 4B. The master RAN node 402 houses the upper layer protocol stack entities (including SDAP 310 and PDCP 308) while the secondary RAN node 406 houses the lower layer protocol stack entities (RLC 306, MAC 304 and PHY 302).

While the UE 202 is registered with the network, it may transition between multiple modes of operation, including:

CONNECTED mode. In this mode, the UE 202 maintains radio bearers with the RAN 212 in order to exchange UP data with servers coupled to the Internet-at-large. In some examples, the CONNECTED mode may be referred to as RRC_CONNECTED.

IDLE mode. In this mode, the UE 202 may remain registered with the CN 214 but there are no RAN 212 resources associated with the UE 202. As a result, the UE 202 is not coupled to the RAN 212 and cannot transmit or receive information. In some examples, the IDLE mode may be referred to as RRC_IDLE.

INACTIVE mode. In this mode, there are no radio resources associated with the UE 202 but the RAN 212 maintains a context for the UE 202 that encompasses the security keys established during authentication of the UE 202 and the configuration parameters associated with all sessions that have been established for the UE 202. The INACTIVE mode allows a UE 202 to enter a low energy mode of operation, similar to IDLE mode, in order to conserve battery power but allows a quick transition to CONNECTED mode in order to transmit and receive information. In some examples, the INACTIVE mode may be referred to as RRC_INACTIVE.

Maintaining the UE 202 in the INACTIVE mode reduces radio link signalling overheads and may result in commensurate battery power savings in the UE 202. Keeping the UE context in the RAN 212 also reduces latencies and network signalling overheads.

Figure 5:
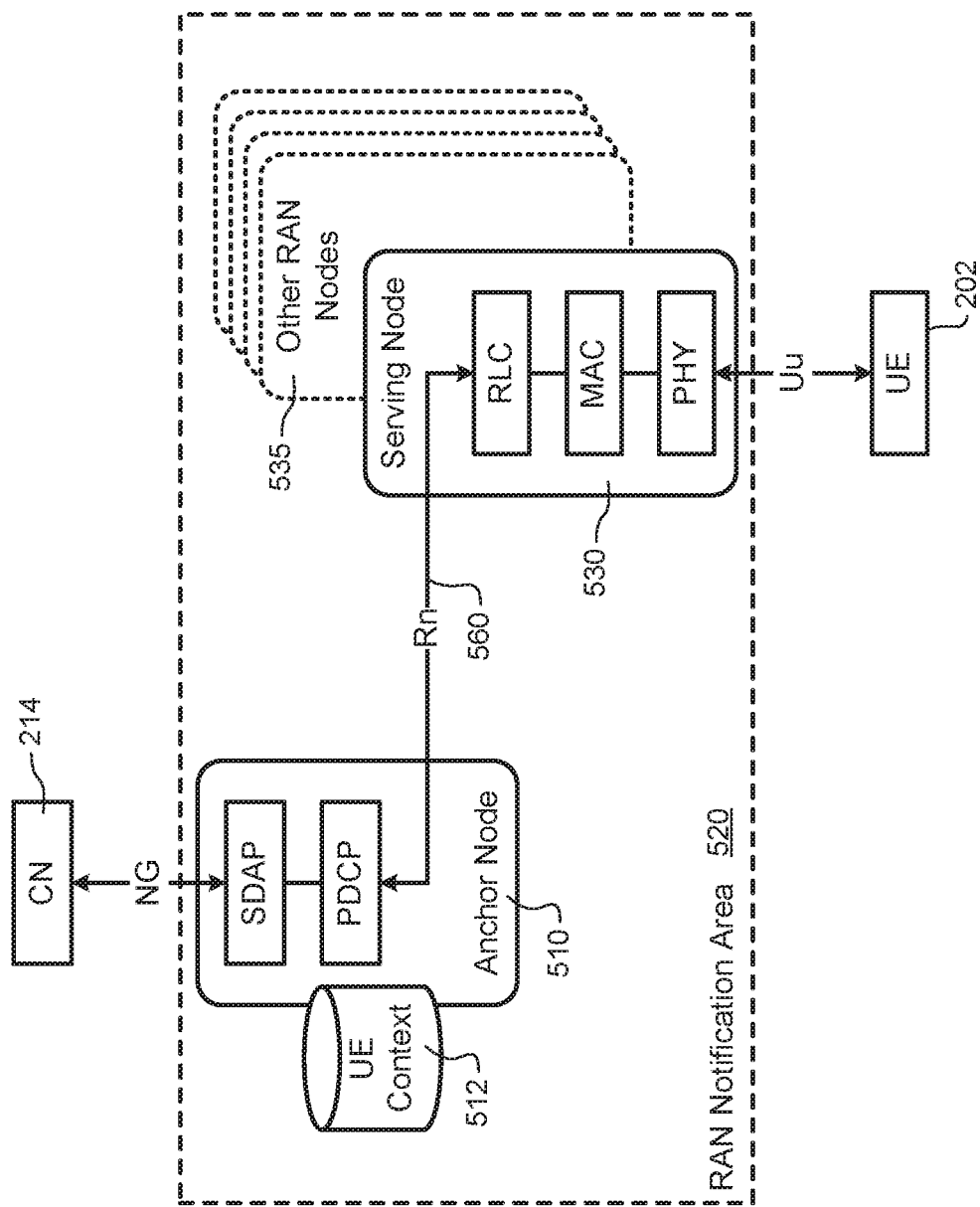
FIG. 5 is a block diagram illustrating a functional system architecture usable in examples of the present disclosure.

FIG. 5 illustrates an example RAN model for INACTIVE mode operations. In this example RAN model:

An anchor RAN node 510 maintains the connections to the CN 214 for the UE 202 (e.g. via NG or S1). The anchor RAN node 510 also maintains, or has access to, the current configuration and other context information 512 associated with the UE 202. In some examples, the anchor RAN node 510 may be a node that previously acted as a serving RAN node 530 of the UE 202, for example when the UE 202 entered the INACTIVE mode. In other examples, the anchor RAN node 510 may be a centralised server configured to act as an anchor RAN node 510 for multiple UEs 202 within the PLMN. In such an example, the anchor RAN node 510 may serve as a dedicated anchor RAN node 510 associated with a plurality of different serving RAN nodes 530.

a RAN notification area (RNA) 520 denotes one or more cells in which the UE 202 can receive service while moving within the PLMN; the scope of the RNA 520 may be as small as the coverage area provided by a single cell or as large as the entire PLMN. If the UE 202 moves outside the designated RNA 520, it may notify the RAN 212 and may be assigned to a different anchor RAN node 510. It should be understood that RNA 520 can also be described as the union of the coverage areas provided by the serving RAN node 530 and the other RAN Nodes 535. The procedure whereby the UE 202 notifies the RAN 212 of movement outside the designated RNA 520 may be described, without limitation, as location notification, RAN location area update, RNA update and/or RAN area update.

the anchor RAN node 510 may be coupled via an intra-RAN backhaul network to one or more other RAN nodes (530 and 535) within the RNA 520; each of those RAN nodes may control one or more cells associated with the RNA 520. The interface between RAN nodes, dubbed Rn 560 in FIG. 5, may be provided as any one or more of an X2 interface, an Xn interface, a CU-DU interface such as F1, or a new interface (which may be similar to any of the X2, Xn or CU-DU interfaces) developed for the purpose.

The example protocol stack illustrated in FIG. 5 is based on the dual-connectivity model shown in FIG. 4B. Accordingly, the upper layer SDAP 310 and PDCP 308 protocol entities and state machines are located in the anchor RAN node 510, while the lower layer RLC 306, MAC 304 and PHY 302 protocol entities (and any state machines used for such an implementation) are located in the serving RAN node 530. However, in contrast to the dual-connectivity model illustrated in FIG. 4B, the serving RAN node 530 does not have access to the UE-specific context 512 for managing transmissions over the radio link (Uu) to the UE 202 when the UE 202 is coupled to the serving RAN node 530. For example, the serving RAN node 530 may not have any one or more of:

configurations for radio bearers currently established for UE 202 (e.g. RLC 306 configuration, PDCP 308 configuration);

radio bearer state information (e.g. received PDU sequence numbers, transmitted PDU sequence numbers);

robust header compression state information (e.g. established flow contexts, flow sequence number);

cryptographic keying material (e.g. keys, counters) for UE 202;

quality of service (QoS) information (e.g. authorised QoS profiles, SDAP QoS flow to DRB mappings);

session information (e.g. identity of CN UPF, identity of CN CPF).

The lack of radio protocol information implies that the serving RAN node 530 retrieves the UE context 512 from the anchor RAN node 510 in order to transition a UE 202 from the INACTIVE to the CONNECTED mode.

RAN Cryptographic Key Derivation

3GPP Technical Specification (TS) 33.401, "3GPP System Architecture Evolution (SAE); Security architecture" defines a UE master cryptographic key dubbed $K_{ASME}$ that can be derived independently by the UE and a CN CPF through an authentication and key agreement procedure. From $K_{ASME}$, cryptographic keys used by a RAN node for encryption and integrity protection are derived from a RAN temporal master key dubbed $K_{eNB}$ in LTE. A similar RAN temporal master key dubbed $K_{gNB}$ is defined for 5G New Radio (NR) operations that is derived from a UE master cryptographic key dubbed $K_{AMF}$. A new RAN temporal master key, dubbed $K_{eNB}*$ for LTE and $K_{gNB}*$ for NR, is derived independently by the UE 202 and its current serving RAN node on every inter-cell and intra-cell handover—i.e. no keys need to be transmitted over the radio link between a UE 202 and the nodes within the RAN 212. Separate temporal keys can then be derived from the master key for encryption and integrity protection of CP traffic and UP traffic.

RAN Temporal Master Key Derivation

In 3GPP TS 33.401, a new $K_{eNB}$ may be derived using either a horizontal key chain or a vertical key chain such that a new generation of the key is based on a previous generation of the key:

for horizontal key derivation, a new $K_{eNB}*$ is derived through a key derivation function (KDF) that takes as inputs: the current $K_{eNB}$; the physical cell identifier (PCI) of the serving cell; and the absolute radio frequency channel number (ARFCN) used on the downlink (DL) of the serving cell. The new $K_{eNB}*$ then becomes the current $K_{eNB}$ for subsequent operations. In 5G, a similar procedure is used for horizontal derivation of a new $K_{gNB}$.

for vertical key derivation, a new $K_{eNB}$ is derived through a KDF that takes as inputs: a next hop (NH) key; the PCI of the serving cell; and the ARFCN used on the DL of the serving cell. In 5G, a similar procedure is used for vertical derivation of a new $K_{gNB}$.

The NH key used for vertical key derivation is computed independently by the UE and a CPF in the CN. A new NH key (NH*) is derived through a KDF that takes as inputs: the current NH key; and the UE master key (e.g. $K_{ASME}$ or $K_{AMF}$). The NH* key then becomes the current NH key for subsequent operations.

When a node or function within the CN 214 decides to generate a new NH key (e.g. following a handover to a new serving RAN node 530), it increments a next-hop chaining count (NCC) and provides the NCC and new NH key to the current serving RAN node 530 using a secure NG-C connection (e.g. secured using IPsec). The NCC acts as a key identifier to synchronise cryptographic operations between the UE 202 and the RAN 212.

On a subsequent handover, the current serving RAN node 530 provides the value of NCC to the UE 202 (e.g. in a handover command). If the received NCC value is different from the value currently stored in the UE 202, the UE 202 generates a new NH key and increments its stored value of NCC; this procedure can be repeated until the stored value of NCC matches the value received from the serving RAN node 530. Once the NCC values match, the corresponding NH key is used to generate a new RAN temporal master key. Using the new RAN temporal master key (e.g. $K_{eNB}$ or $K_{gNB}$), the UE 202 can generate temporal keys for cryptographic operations in the new serving cell.

RAN Temporal Keys and Cryptographic Operations

RAN temporal keys are derived from the RAN temporal master key (e.g. $K_{eNB}$ or $K_{gNB}$) and are used for encryption and integrity protection of CP traffic and UP traffic. A different temporal key can be used for each cryptographic procedure:

- a CP encryption key (e.g. $K_{RRCenc}$) is used for privacy protection of RRC 312 messages;
- a CP integrity protection key (e.g. $K_{RRCint}$) is used for integrity protection of RRC 312 messages;
- a UP encryption key (e.g. $K_{UPenc}$) is used for privacy protection of UP data;
- a UP integrity protection key (e.g. $K_{UPint}$) is used for integrity protection of UP data.

In some situations, the UP keys are applied to all DRBs associated with a UE 202. In other situations, different UP keys are used for different sessions; all DRBs associated with a given session could use the same keys but DRBs associated with a different session would use a different key.

In 3GPP TS 33.401, each of the temporal keys is generated using a KDF that takes as inputs at least one of:
the RAN temporal master key (e.g. $K_{eNB}$ or $K_{gNB}$);
a pre-defined constant value that identifies the temporal key being generated; and
a pre-defined constant value that may in some examples identify a cryptographic algorithm (e.g. Advanced Encryption Standard (AES)) selected by the RAN 212 used for encryption/integrity protection.

Each cryptographic operation (encryption or integrity protection) uses a pseudo-random function determined by the selected cryptographic algorithm that takes as inputs at least one of:

the corresponding temporal key;
the radio bearer number (BEARER);
the direction of transmission (UL(0) or DL(1));
the length of the PDCP PDU (LENGTH); and
a counter associated with the PDCP instance (COUNT).

In accordance with examples of the present disclosure, before initiating a transition from INACTIVE to CONNECTED mode, validation of the CP message conveying a request from the UE 202 to the RAN 212 can be performed using a message integrity check (MIC) (also known as a message authentication code for integrity (MAC-I)) computed by the UE 202 using cryptographic keys derived for use with the anchor RAN node 510. The RAN node 530 currently serving the UE 202 can transparently forward the request to the anchor RAN node 510 where the MIC can be validated using information in the UE context 512 stored at the anchor RAN node 510. If the MIC is successfully validated, the anchor RAN node 510 may decide to keep the UE 202 in the INACTIVE mode or to initiate a transition to the CONNECTED mode.

The anchor RAN node 510 may also decide whether to retain its role of anchor for UE 202 or to allow the role of anchor to be moved to the new serving RAN node 530. If the anchor RAN node 510 decides to retain its role as anchor for UE 202, configuration parameters may be updated in the UE 202 through a CP RRC message that is protected using keys associated with the anchor RAN node 510. If the anchor RAN node 510 decides to relocate the anchor role to the new serving RAN node 530, the anchor RAN node 510 can provide the serving RAN node 530 with UE context 512 allowing the generation of a new set of cryptographic keys that are associated with the new serving RAN node 530.

In all cases, provision can be made for determining the validity of the UE request before UE context 512 is transferred to the new serving RAN node 530 and for securing all CP communications with the UE 202.

Generic Procedure Overview

Figure 6A:
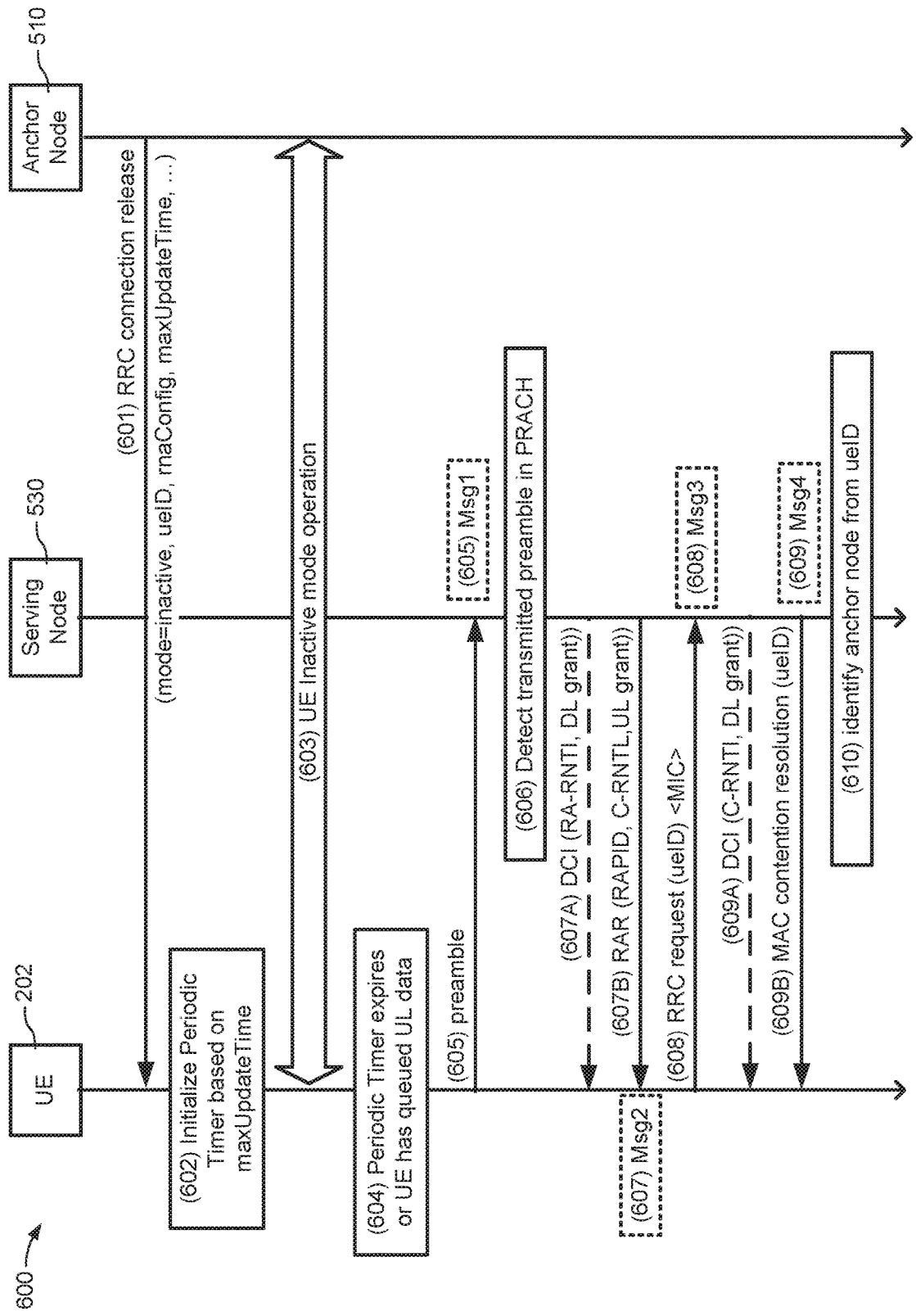
FIGS. 6A-6B show a message flow diagram illustrating a process in accordance with a representative example of the present disclosure.
Figure 6B:
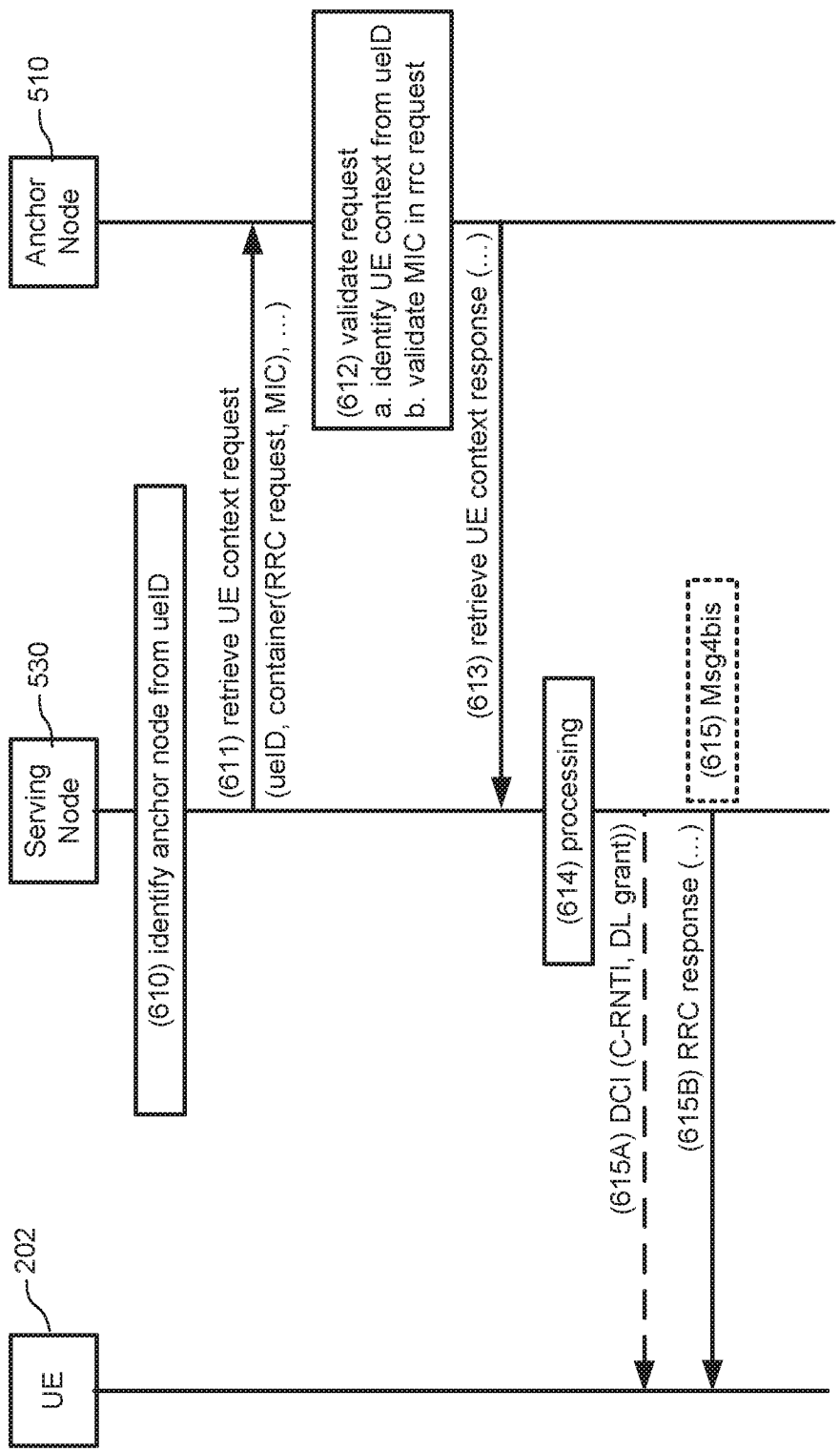

FIGS. 6A-6B illustrate a generic procedure 600, using a modified 4-step random access procedure (as described in 3GPP TS 38.321, "NR; Medium Access Control (MAC) protocol specification"). This procedure may be implemented between the UE 202, serving RAN node 530 and anchor RAN node 510 described above with reference to FIG. 5, and may include the following steps.

601: The anchor RAN node 510 decides to transition the UE 202 from the CONNECTED mode to the INACTIVE mode. The anchor RAN node 510, having made this determination may transmit an RRC connection release message to the UE 202; this message may include:
an indication of the intended mode of operation—i.e. INACTIVE mode;
an identifier (e.g. ueID) assigned to the UE 202 and to be used by the UE 202 while operating in the INACTIVE mode;
an indication of the RNA 520 (e.g. rnaConfig) where the UE 202 can receive service while operating in the INACTIVE mode;
the maximum time between location notifications initiated by the UE 202 (e.g. maxUpdateTime).

CP temporal keys generated for use in the serving cell of the anchor RAN node 510 can be used for integrity protection ($K_{RRCint}$) and encryption ($K_{RRCenc}$) of the RRC connection release message.

602: Following receipt of the RRC connection release message from the anchor RAN node 510, the UE 202 may initialise a periodic location notification timer. Initialization of the periodic location notification timer may be based on the maximum time between location notifications (e.g.

maxUpdateTime), which may have been indicated by the anchor RAN node 510 (typically indicated in the RRC connection release message transmitted to the UE 202).

603: While operating in the INACTIVE mode, the UE 202 may move into the coverage of cells controlled by a different RAN node.

604: While in the INACTIVE mode, the UE 202 decides to initiate an uplink (UL) transmission. This decision may, for example, be triggered by expiry of the periodic location notification timer or by the queuing of UL data that are to be transmitted.

In response to the decision to initiate an UL transmission, the UE 202 begins a cell selection procedure to identify a suitable cell for re-establishing a radio link connection. The RAN node controlling the selected cell is dubbed the serving RAN node 530.

605: random access request (Msg1). Based on physical random access channel (PRACH) configuration broadcast as system information by the serving cell, the UE 202 may select a preamble (e.g. a Zadoff-Chu sequence) and transmit the selected preamble towards the serving RAN node 530 using the PRACH configuration. The selection of a preamble may be a random or pseudo-random selection in some examples.

606: Following receipt of the preamble from the UE 202, the serving RAN node 530 can schedule a DL random access response (RAR) message to be sent to the UE 202.

607A and 607B: random access response (Msg2). The serving RAN node 530 may schedule (at 607A) a DL transmission to the UE 202 (using a downlink control information (DCI) message encoded with a random access radio network temporary identifier (RA-RNTI) and including a DL grant) and then transmit (at 607B) the RAR to the UE 202. This RAR message may include:
  a random access preamble identifier (RAPID) corresponding to the detected preamble;
  a cell RNTI (C-RNTI) to be used by the UE 202 for scheduled transmissions within the serving cell;
  an UL grant that can be used by the UE 202 for the UL transmission of Msg3.

608: UE 202 identification and access request (Msg3). Using the UL grant provided in the RAR associated with the RAPID corresponding to the random access preamble selected by the UE 202, the UE 202 may transmit a CP message (e.g. a RRC request) to the serving RAN node 530. The RRC request message may include the INACTIVE mode identifier (ueID) assigned to the UE 202 by the anchor RAN node 510 in step 601. The UE 202 may then start a contention resolution timer.

The RRC request may also include a MIC computed using the CP integrity protection key ($K_{RRCint'}$) associated with the anchor RAN node 510 (i.e. the same integrity protection key used for the MIC of the RRC connection release message in step 601).

Optionally, the RRC request may be encrypted using the CP encryption key ($K_{RRCenc'}$) associated with the anchor RAN node 510 (i.e. the same encryption key used for protection of the RRC connection release command in step 601). In this case, the INACTIVE mode identifier (ueID) can be included as cleartext in a lower layer element of Msg3, e.g. a MAC control element (CE) or PDCP information element. The existence of this information element can be interpreted by the serving RAN node 530 as initiation of an INACTIVE mode transaction.

609A and 609B: contention resolution (Msg4). If the serving RAN node 530 successfully decodes an UL transmission 608 according to the grant provided in step 607B, it can schedule (at 609A) a transmission to the UE 202 (using a DCI message encoded with the C-RNTI assigned in step 607 and a DL grant), followed (at 609B) by a contention resolution message (Msg4) that echoes the ueID received by the serving RAN node in Msg3. Msg4 may comprise a MAC CE containing the ueID.

If the ueID received by the UE 202 in Msg4 matches the identifier that the UE 202 transmitted in Msg3, the random access is deemed successful and the UE 202 can monitor the physical downlink control channel (PDCCH) for subsequent DCI messages encoded with the C-RNTI assigned in step 607.

If the ueID received by the UE 202 does not match the identifier it transmitted in Msg3, or if the contention resolution timer expires, the random access is deemed unsuccessful (e.g. another UE may have selected the same preamble in step 601) and the UE 202 restarts the random access procedure.

610: Using information extracted from the ueID received in Msg3, the serving RAN node 530 identifies the anchor RAN node 510 associated with the UE 202 when it entered INACTIVE mode and initiates a transaction with the anchor RAN node 510 to retrieve the UE context 512.

As shown starting in FIG. 6B, the process continues to 611: The serving RAN node 530 transmits a UE context retrieval request towards an identified anchor RAN node 510. The UE context retrieval request includes the ueID and an information element that may transparently contain the RRC request and MIC received from the UE 202 in Msg3 (step 608).

612: Using information extracted from the received ueID, the anchor RAN node 510 determines a current set of temporal keys associated with the UE 202. This determination may be performed in accordance with stored UE context 512 that can be accessed by the anchor RAN node 510. The anchor RAN node 510 can then use the CP integrity protection key ($K_{RRCint'}$), which can be either stored in the UE context 512 or reconstituted based on the stored UE context 512, to validate the MIC provided by the UE 202, to the serving RAN node 530, in the RRC request (step 608).

613: If the MIC is successfully validated, the anchor RAN node 510 transmits a UE context retrieval response to the serving RAN node 530, which may contain the UE context 512 associated with the UE 202 when it entered the INACTIVE mode.

If the MIC fails, the anchor RAN node 510 can abort the procedure by reporting an error to the serving RAN node 530. In another example, the anchor RAN node 510 may abort the procedure by not transmitting any reply message to the serving RAN node 530. The serving RAN node 530 can determine that the process has failed either through the receipt of the message reporting an error, or through a determination that the anchor RAN node 510 is alive and has not responded within a defined time period.

614: If the serving RAN node 530 successfully receives a UE context retrieval response from the anchor RAN node 510, it uses the received information to construct a CP RRC response to the UE 202:
  in some situations, the CP RRC response may be provided by the anchor RAN node 510, including a MIC computed using the anchor RAN node 510 CP integrity protection key ($K_{RRCint'}$); the prepared response is then transparently relayed to the UE 202 by the serving RAN node 530.
  in other situations, the serving RAN node 530 uses the UE context 512 provided by the anchor RAN node 510 to generate a new set of cryptographic keys for use within the cell serving the UE 202; the serving RAN node 530 uses the new keys to protect CP RRC messages subsequently exchanged with the UE 202.

615A and 615B: access request acknowledgement (Msg4bis). The serving RAN node 530 subsequently schedules (at 615A) a DL transmission to the UE 202 (using a DCI encoded with the C-RNTI assigned in step 607 and a DL grant) and transmits (at 615B) the RRC response to the RRC request sent in Msg3 (step 608).

if the RRC 312 response is protected using a new set of cryptographic keys for use within the cell serving the UE 202, cryptographic parameters needed by the UE 202 to autonomously generate the keys are provided by the serving RAN node 530 as cleartext in lower layer elements of the message, e.g. in one or more MAC CEs or PDCP information elements. Additional cryptographic parameters may also be provided in Msg4bis, e.g. a cryptographic algorithm identifier.

As a result of this procedure:
a) the old integrity protection key, derived for use with the anchor RAN node 510, can be used for protection of Msg3 and, subsequently, for validation of the RRC request by the anchor RAN node 510.
b) horizontal or vertical key derivation may be used for generation of the new RAN temporal master key (e.g. $K_{eNB}^*$ or $K_{gNB}^*$).
c) a new cryptographic algorithm may be selected by the new serving RAN node 530, different from the algorithm used by the anchor RAN node 510.
d) Msg3 is integrity protected and optionally encrypted (with anchor RAN node 510 keys).
e) Msg4bis is both integrity protected and encrypted (with new serving RAN node 530 keys).
f) cryptographic protection is provided to all RRC messages (i.e. all RRC messages are authenticated and may be encrypted).
g) early validation of the UE 202 is provided (i.e. at step 612, before transmission of Msg4bis and before UE context 512 is returned to the serving RAN node 530).

Procedure for INACTIVE to CONNECTED Transition

This section describes the INACTIVE to CONNECTED (i2c) mode procedure that is initiated by a UE 202 and follows the generic procedure described above. In this procedure:
a CP request to resume a connection that is received from the UE 202 (e.g. in Msg3) is integrity protected using the integrity protection key associated with the anchor RAN node 510 ($K_{RRCint'}$);
the anchor role is moved from the current anchor RAN node 510 to the new serving RAN node 530 following validation of the MIC;
a CP command to resume the connection transmitted from the serving RAN node 530 (e.g. in Msg4bis) is both integrity protected and encrypted using a cryptographic algorithm selected by the serving RAN node 530 and a new set of temporal keys derived for use in the new serving cell.

Figure 7A:
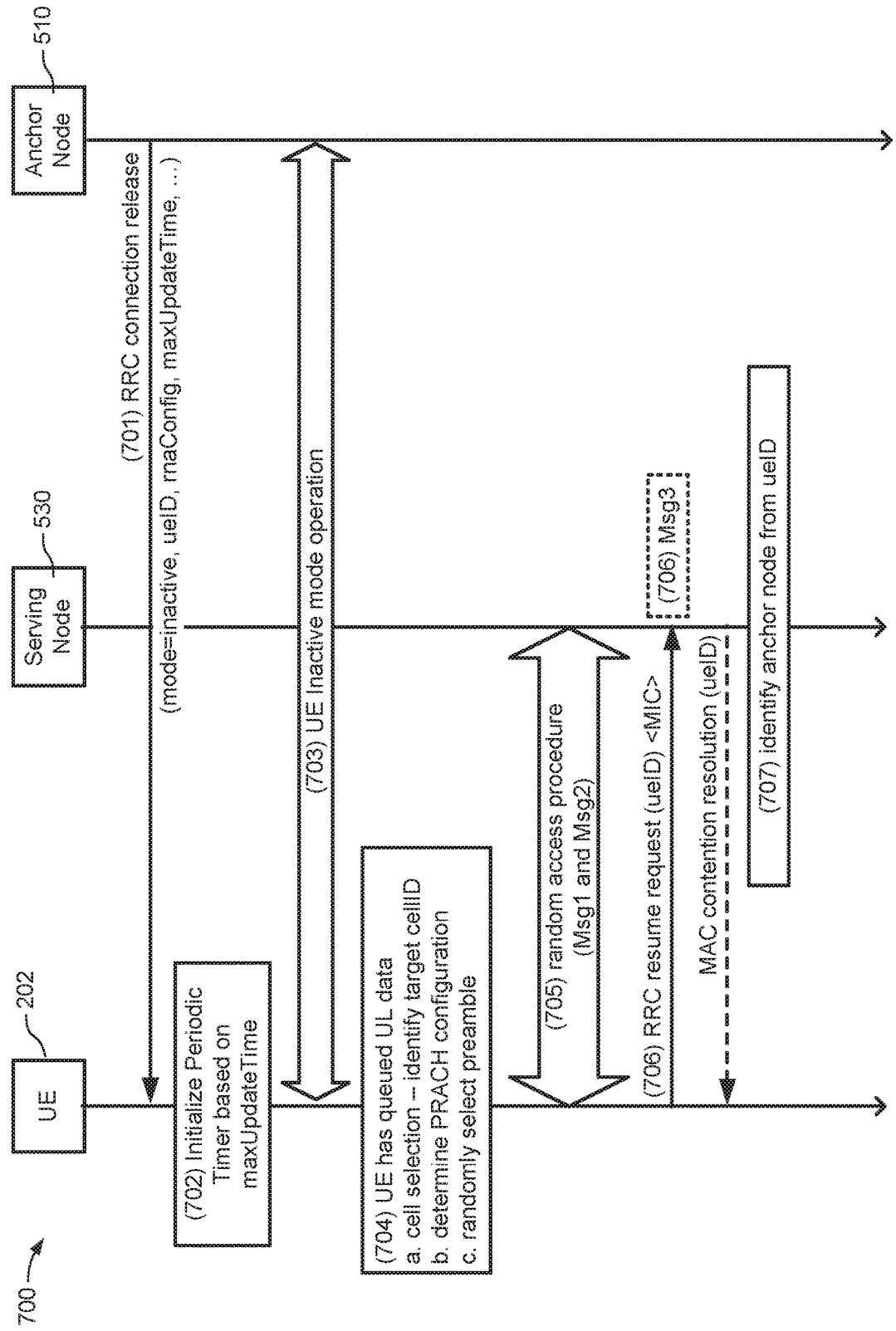
FIGS. 7A-7C show a message flow diagram illustrating a process in accordance with a representative example of the present disclosure.
Figure 7B:
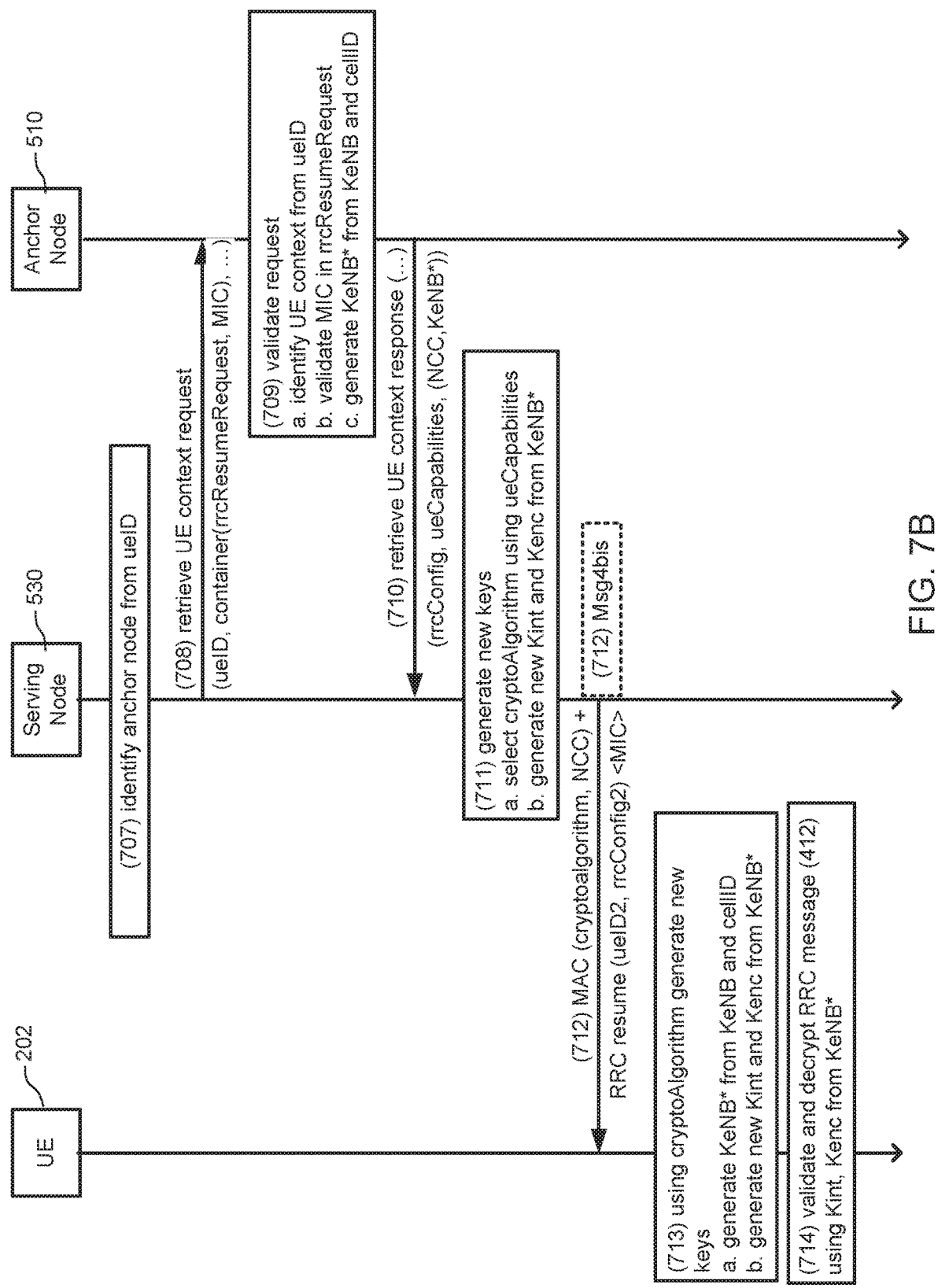
Figure 7C:
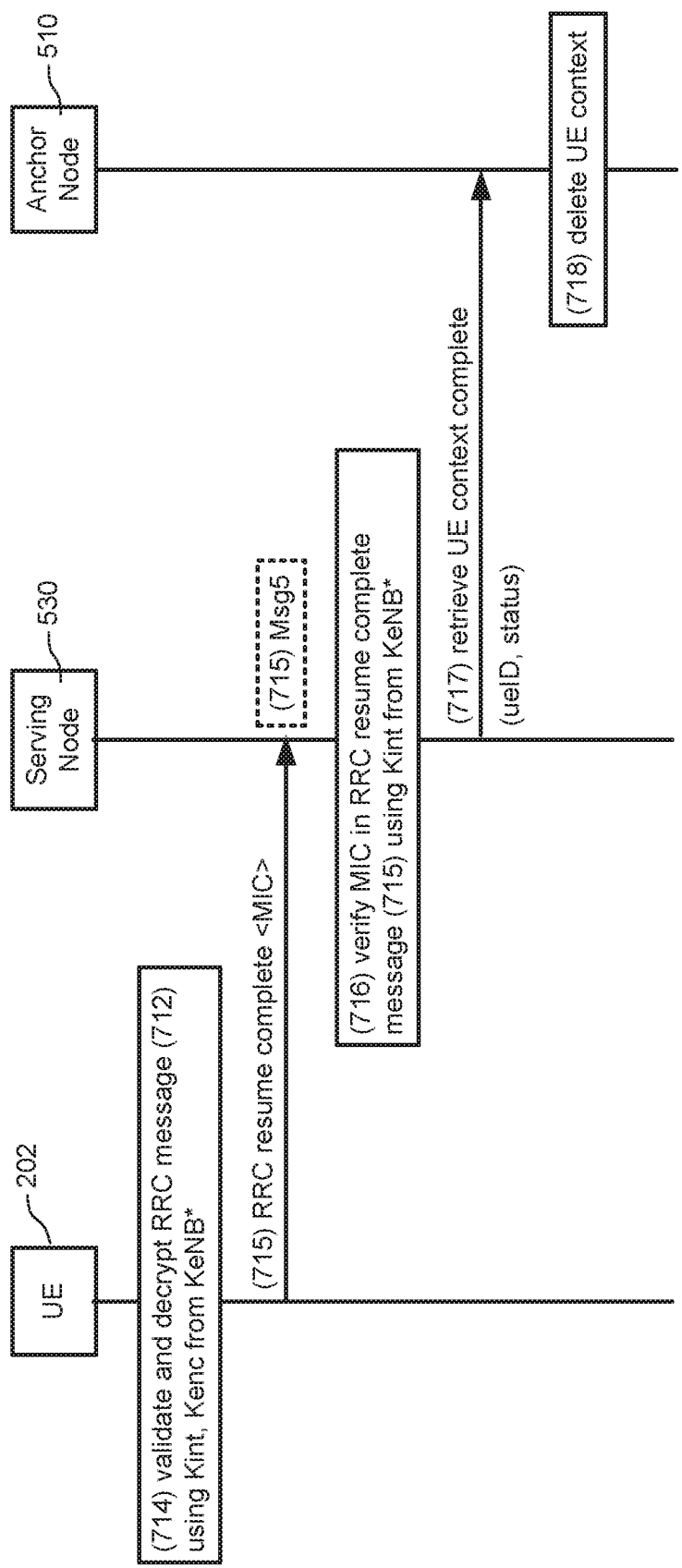

The steps in this procedure (700), illustrated in FIGS. 7A-7C, include:

701-705: With the UE 202 operating in the INACTIVE mode, the UE 202 decides to initiate a transition to the CONNECTED mode. This decision may, for example, be triggered by the queuing of data that will be transmitted on the UL to the RAN. In response to any of these factors, or any other determination that the UE 202 should transition to the CONNECTED mode, the UE 202 can initiate a random access procedure (705) with the serving RAN node 530.

The connection release, cell selection and random access procedures are similar to steps 601-607 of FIG. 6.

706: The UE 202 transmits a RRC resume request message to the serving RAN node 530 (e.g. in Msg3 of the random access procedure). The RRC resume request message may include the INACTIVE mode identifier (ueID) assigned to the UE 202 by the anchor RAN node 510 (e.g. in step 701).

The resume request message can include a MIC such as an integrity checksum or check value computed using the CP integrity protection key ($K_{RRCint'}$) associated with the anchor RAN node 510 (i.e. the same integrity protection key used for the MIC of the connection release message in step 701).

Optionally, the resume request message may be encrypted using the CP encryption key ($K_{RRCenc'}$) associated with the anchor RAN node 510. In this case, the INACTIVE mode identifier (ueID) is included as cleartext in a lower layer element of step 706 (Msg3), e.g. a MAC CE or PDCP information element; the existence of this information element is interpreted by the serving RAN node 530 as initiation of an i2c transition.

707-709: Similar to steps 610-611 of FIGS. 6A-6B, the serving RAN node 530 identifies the anchor RAN node 510 and sends a UE context 512 retrieval request (708) to the anchor RAN node 510. The UE context 512 retrieval request may include any or all of the ueID, the resume request and MIC received from the UE 202. Using UE context 512 associated with the received ueID, the anchor RAN node 510 can validate the MIC provided by the UE 202 in the resume request and, if the validation is successful, the anchor RAN node 510 can retrieve the requested UE context information (709).

710: If the MIC is successfully validated, the anchor RAN node 510 can return a UE context retrieval response to the serving RAN node 530 that includes any or all of:
RRC configuration information provided to the UE 202 by the anchor RAN node 510 (e.g. rrcConfig1);
UE capabilities (e.g. ueCapabilities) previously determined by the anchor RAN node 510 (e.g. supported cryptographic algorithms); and
UE security association information (e.g. current NCC and $K_{eNB}^*$ or $K_{gNB}^*$).

711: Based on the UE context 512 received from the anchor RAN node 510, the serving RAN node 530 can:
select a cryptographic algorithm supported by both the UE 202 and the serving RAN node 530;
generate a corresponding set of temporal encryption and integrity check keys (described above) based on the received RAN temporal master key (e.g. $K_{eNB}^*$ or $K_{gNB}^*$).

712: The serving RAN node 530 transmits a message to the UE 202 (e.g. in Msg4bis) that includes a resume command, the cryptographic algorithm selected by the serving RAN node 530 and the NCC value received from the anchor RAN node 510. The cryptographic algorithm and the NCC value can be provided in cleartext in a lower layer element of Msg4bis, e.g. a MAC control element (CE) or PDCP information element. The resume command can be integrity protected using the new CP integrity protection key ($K_{RRCint}$) derived by the serving RAN node 530. The resume command may also be encrypted using the new CP encryption key ($K_{RRCenc}$) derived by the serving RAN node 530. If the resume command is encrypted, the serving RAN node 530 may include modified RRC configuration information in this message rather than using a separate connection reconfiguration message at a later time.

713: Using the specified cryptographic algorithm, the UE 202 can:
- verify that the received value of NCC matches its stored value of NCC and, if there is a mismatch, compute NH* to match the received value of NCC;
- generate a new RAN temporal master key (e.g. $K_{eNB}{*}$ or $K_{gNB}{*}$) based on the current $K_{eNB}/K_{gNB}$ (or NH*) and the cell currently serving the UE 202; and
- generate a corresponding set of temporal encryption and integrity check keys.

714: Using the new CP keys ($K_{RRCenc}$ and $K_{RRCint}$), the UE 202 can decrypt the resume command and validate the MIC received from the serving RAN node 530. In some examples, the decryption and validation may be performed separately with intervening steps.

715: If the resume command is successfully validated, the UE 202 sends a resume complete message (e.g. Msg5) to the serving RAN node 530 that can be integrity protected using the new CP integrity protection key ($K_{RRCint}$) and encrypted using the new CP encryption key ($K_{RRCenc}$).

716: The serving RAN node 530 can decrypt the received message using the CP encryption key ($K_{RRCenc}$) which may have been previously derived by the serving RAN node 530. The serving RAN node 530 can validate the MIC included in the received message using the CP integrity protection key ($K_{RRCint}$).

717: If the resume complete message is successfully validated, the serving RAN node 530 sends a UE context retrieval complete message to the old (or previous) anchor RAN node 510, confirming that the serving RAN node 530 has successfully assumed the role of anchor RAN node 510 for UE 202.

718: When it receives the UE context retrieval complete message, the old anchor RAN node 510 may delete the stored UE context 512 for UE 202.

The old anchor RAN node 510 should not delete the stored UE context 512 before receiving the UE context retrieval complete message because the serving RAN node 530 may not succeed in becoming the new anchor RAN node 510 for UE 202, and it may be advantageous to ensure that the UE context 512 is not deleted until another node can assume anchor RAN node 510 responsibilities. For example:
- the UE 202 may move to a different serving cell, associated with a different RAN node, before completing the resume procedure;
- validation of the UE 202 by the serving RAN node 530 may fail (e.g. due to a replay attack by a bogus UE 202);
- the retrieval response from the anchor RAN node 510 to the serving RAN node 530 in step 710 may be lost.

Procedures for Location Notification

This section describes several procedures for applying the generic procedure described above to RRC messages passing between a UE 202 and the RAN 212 in order for a UE 202 to notify the RAN 212 of its current location. Location notification may be initiated by a UE 202 due to expiration of a periodic timer or due to mobility outside of a designated RNA 520.

In both cases, location notification may or may not result in a change of anchor RAN node 510 and/or an update to the configuration parameters used by the UE 202 while operating in the INACTIVE mode. The updated configuration parameters may include:
- RNA 520 may be changed to encompass a different set of cells based, for example, on the RAN nodes that are neighbours to the current serving RAN node 530. A rolling update to the configured RNA 520 may be used, for example, as a trade-off between paging overhead for DL traffic and overhead for UL location reporting.
- periodic timer may be changed, for example, based on cell deployment at the current location (e.g. during a transition between urban small cell and suburban/rural macro cell deployment) or the proximity of the UE 202 to a geographical point of interest (e.g. to a RNA or tracking area boundary, to a PLMN boundary, to a tunnel).
- UE INACTIVE mode identifier (ueID) may be changed, for example, to reflect a change in the anchor RAN node 510 or as a security measure by a particular anchor RAN node 510 to limit the use and/or lifetime of a particular identifier.

Relocation of the anchor role (also referred to as responsibilities of an anchor RAN node 510) to the serving RAN node 530 is a decision made by the current anchor RAN node 510. Because a change in the anchor role may involve additional processing (and consumption of battery power) in the UE 202 (e.g. for the generation of new cryptographic keys), the current anchor RAN node 510 may retain its role for UE 202 when the UE 202 moves outside the designated RNA 520; retaining its role as anchor is predicated on the ability of the RAN node to communicate to the set of potential serving RAN nodes 530 within a new RNA 520.

Similarly, the current anchor RAN node 510 may decide to relocate the role of anchor to the serving RAN node 530 following a periodic location update from the UE 202 even though the UE 202 is still within its designated RNA 520. The current anchor RAN node 510 may make this decision based, for example, on its current load, on a projected trajectory for a mobile UE 202, or on network latencies associated with the backhaul network between RAN nodes or between the RAN 212 and CN 214 nodes associated with the UE 202.

Location Notification, without Change in Anchor Role

In this procedure, validation of the location notification is performed by the anchor RAN node 510 and the updated INACTIVE mode configuration is returned by the anchor RAN node 510 to the serving RAN node 530. UE context 512 is not provided to the serving RAN node 530, therefore a new set of cryptographic keys is not generated at the serving RAN node 530; as a consequence, the updated configuration is protected by the anchor RAN node 510 using the CP keys associated with the anchor RAN node 510. In this procedure, the serving RAN node simply acts as a transparent relay for signalling between the UE 202 and the anchor RAN node 510.

Figure 8A:
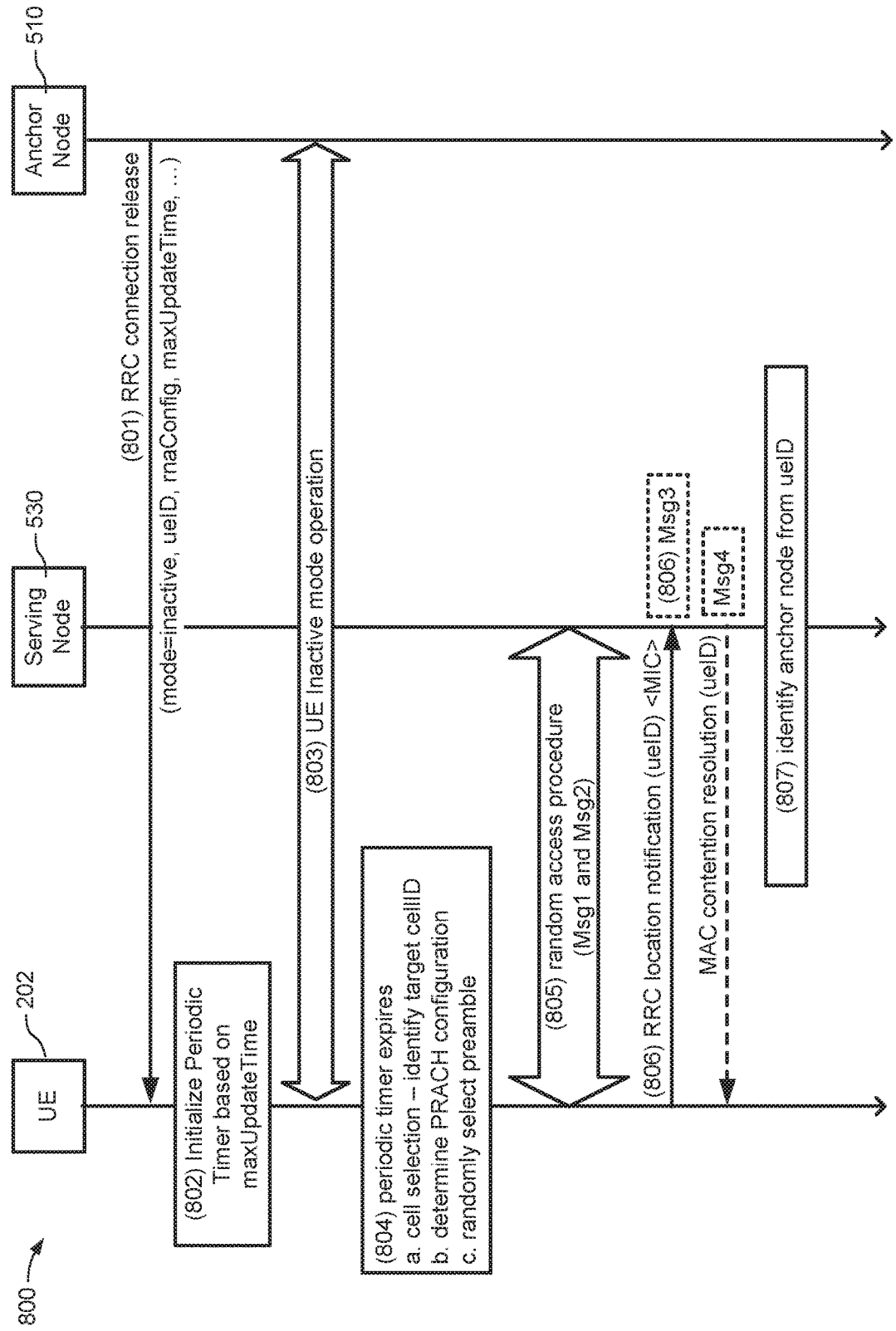
FIGS. 8A-8B show a message flow diagram illustrating a process in accordance with a representative example of the present disclosure.
Figure 8B:
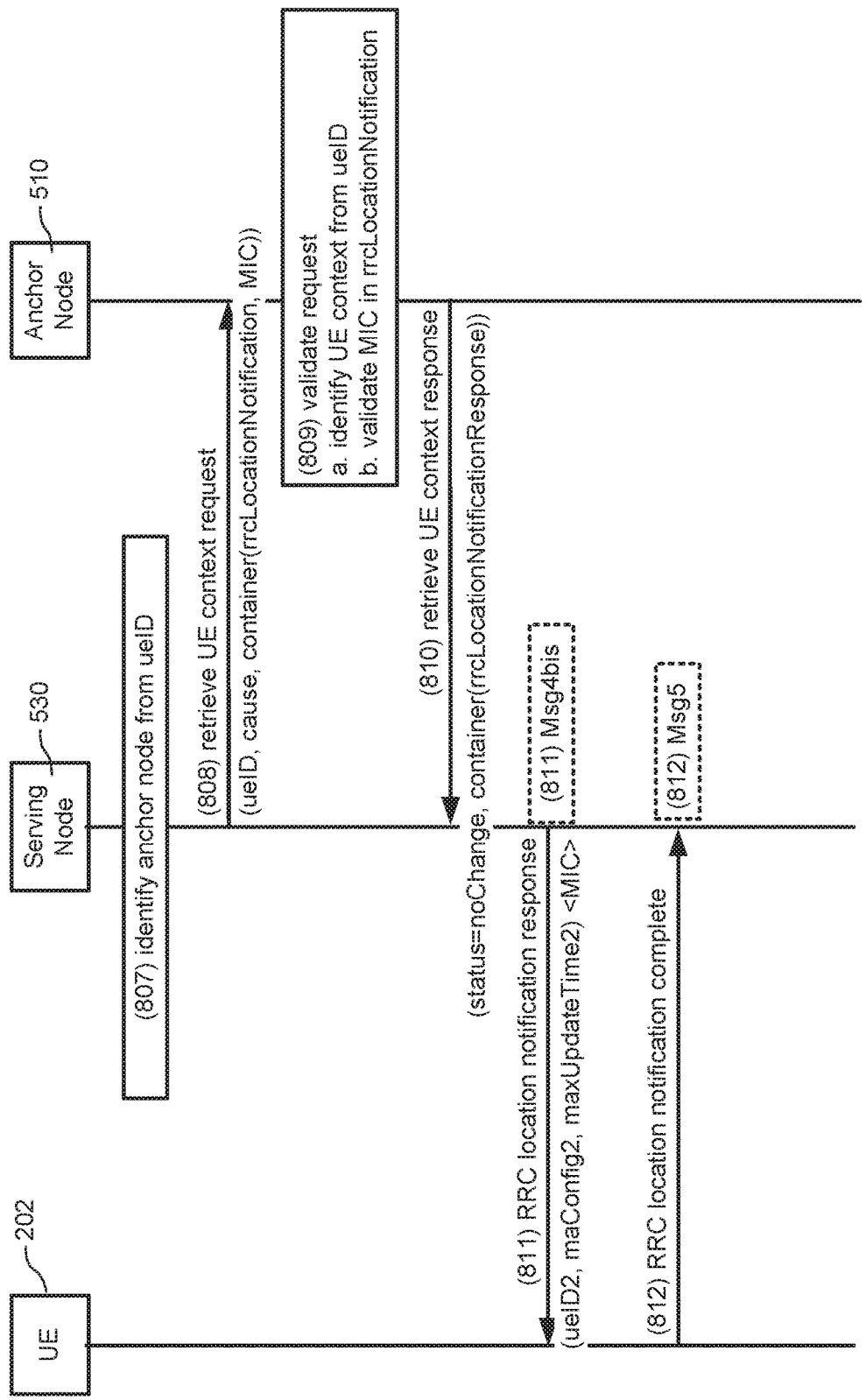

The steps in this procedure (800), illustrated in FIGS. 8A-8B, include:

801-809: With the UE 202 operating in the INACTIVE mode, the periodic location notification timer expires and the UE 202 transmits a location notification message that is received by the serving RAN node 530. The serving RAN node 530 can act as a relay to forward or otherwise transmit this message to the anchor RAN node 510 indicated by the ueID received from the UE 202.

This procedure is similar to steps 601-612 described above with reference to FIGS. 6A-6B.

810: If the MIC provided by the UE 202 is successfully validated, the anchor RAN node 510 may decide to not relocate the anchor role to the current serving RAN node 530 (e.g. the anchor RAN node 510 may decide to keep the anchor role instead of relocating the responsibilities to the serving RAN node 530). In this case, the anchor RAN node 510 returns a UE context retrieval response to the serving RAN node 530 that may include:

an indication that the anchor role is not changing and that UE context 512 is not being provided to the serving RAN node 530;

an information element that contains a location notification response, possibly transparently, from the anchor RAN node 510 to the UE 202; the location notification response may include:

a MIC computed by the anchor RAN node 510 using a CP integrity protection key ($K_{RRCint'}$) associated with the anchor RAN node 510 (e.g. the same integrity protection key used for the MIC of the connection release command in step 801);

optionally, a new set of configuration parameters to be used by the UE 202 while operating in INACTIVE mode—e.g. updated RNA 520, maximum periodic update time, and/or INACTIVE mode identifier (ueID).

The location update response may also be encrypted using a CP encryption key ($K_{RRCenc'}$) associated with the anchor RAN node 510.

811: Based on the received response from the anchor RAN node 510, the serving RAN node 530 transmits a message to the UE 202 (e.g. Msg4bis) that includes the location notification response provided by the anchor RAN node 510.

812: Using the CP keys derived for use with the anchor RAN node 510 ($K_{RRCenc'}$ and $K_{RRCint'}$), the UE 202 decrypts the location notification response and validates the MIC.

If the location update response is successfully validated, the UE 202 may optionally send a location notification complete message (e.g. Msg5) to the serving RAN node 530 as confirmation that it is resuming INACTIVE mode operation.

Location Notification, with Change in Anchor Role

In this procedure, following validation of the location notification by the current anchor RAN node 510, the anchor RAN node 510 decides to relocate the anchor role to the serving RAN node 530. As a result, the anchor RAN node 510 returns the UE context 512 to the serving RAN node 530 where, following procedure 800, the serving RAN node 530 generates a new set of cryptographic keys and instructs the UE 202 to return to CONNECTED mode for reconfiguration by the serving—now new anchor—RAN node.

Figure 9A:
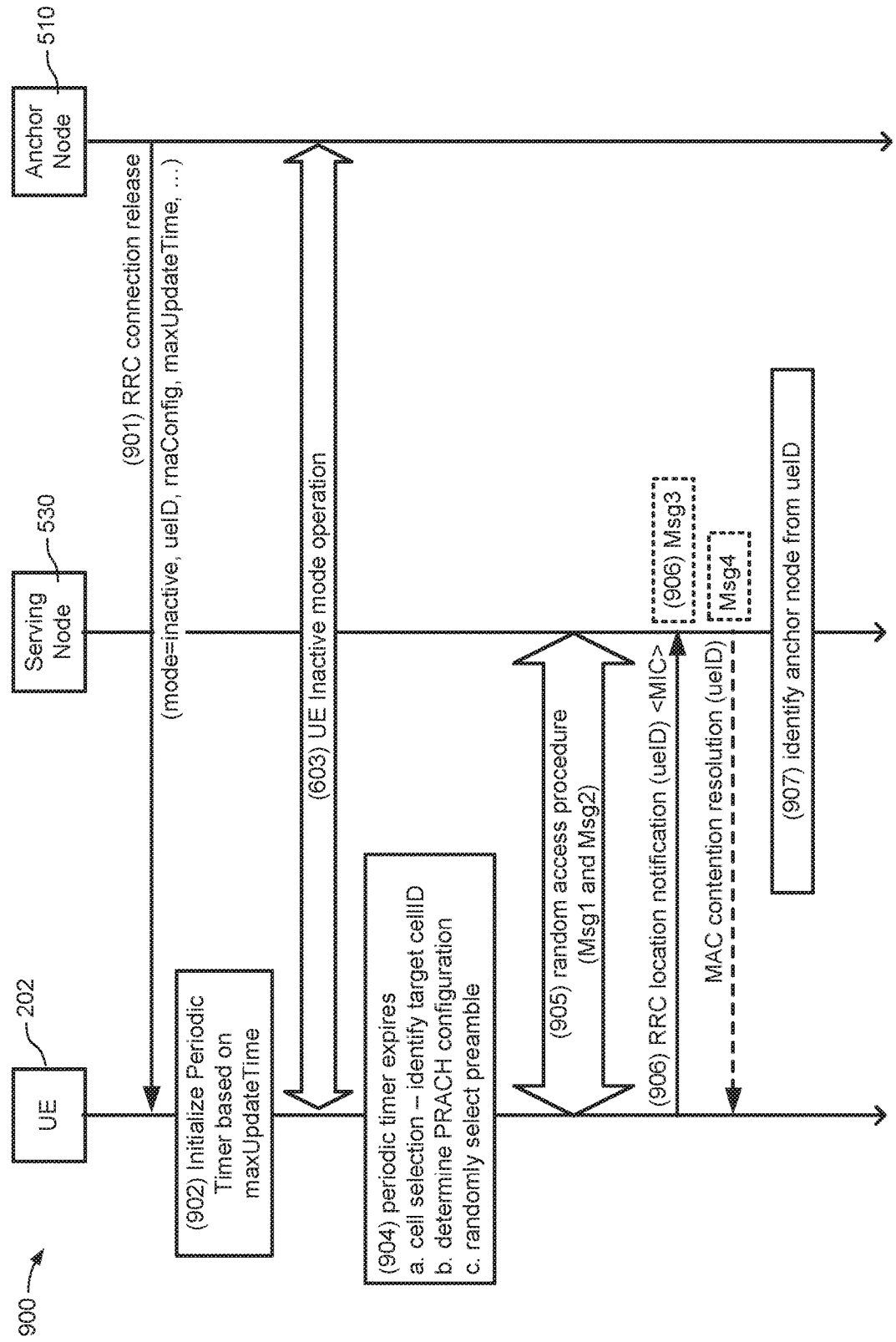
FIGS. 9A-9C show a message flow diagram illustrating a process in accordance with a representative example of the present disclosure.
Figure 9B:
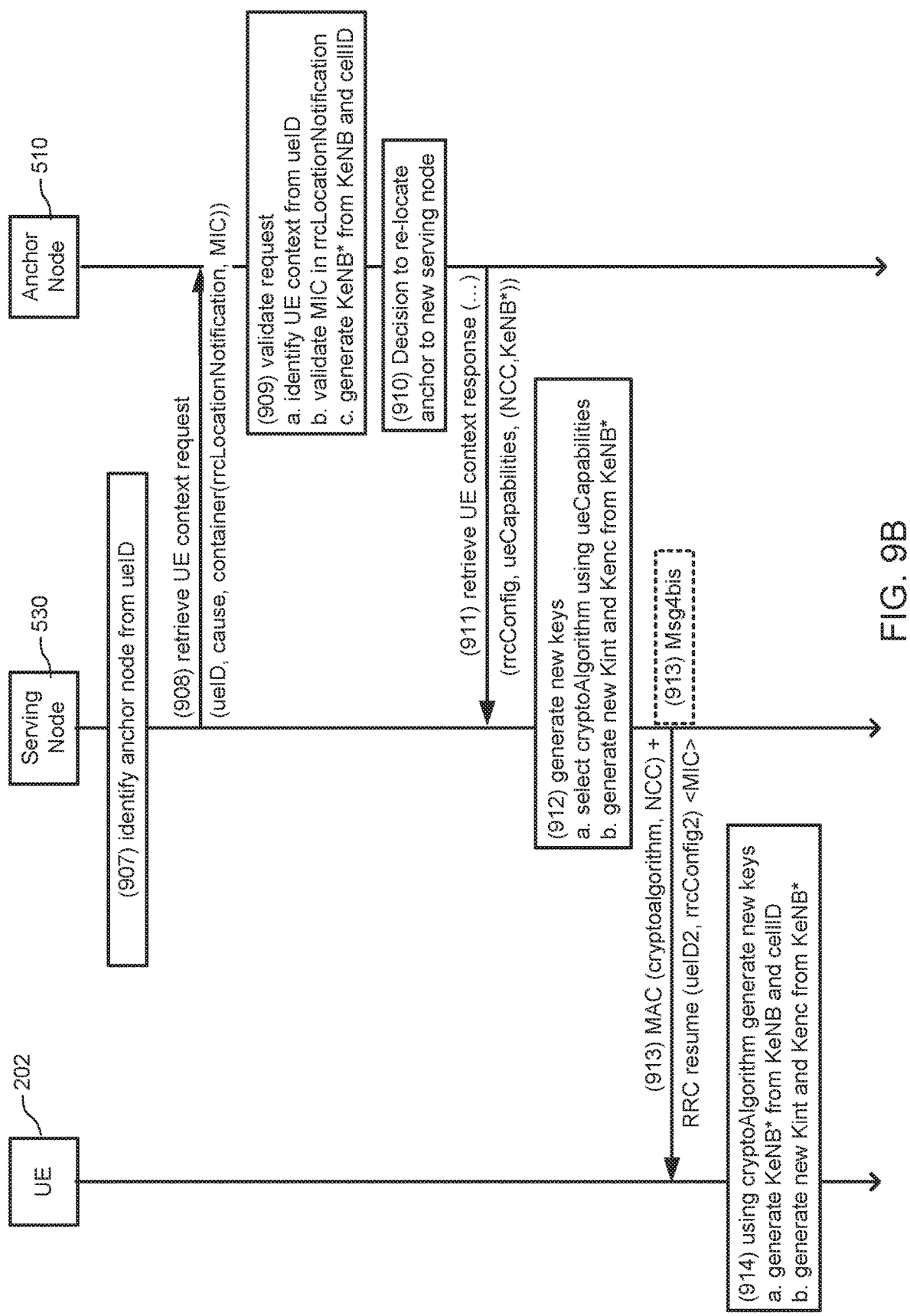
Figure 9C:
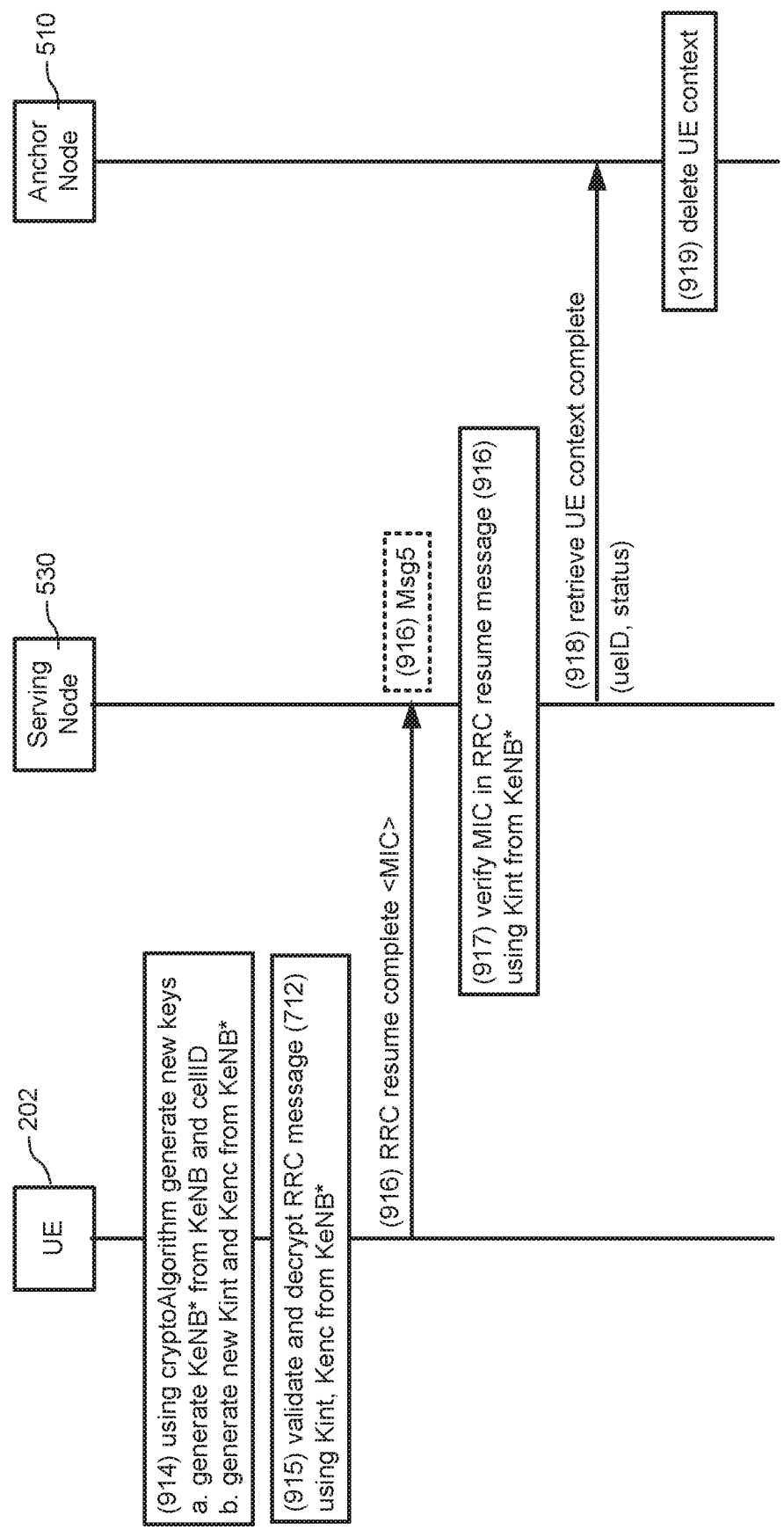

The steps in this procedure (900), illustrated in FIGS. 9A-9C, include:

901-909: With the UE 202 operating in the INACTIVE mode, a periodic location notification timer expires and the UE 202 transmits a location notification message to the serving RAN node 530. The serving RAN node 530 then relays this message to the anchor RAN node 510 indicated by the ueID received from the UE 202.

This procedure is similar to steps 601-612 described above with reference to FIGS. 6A-6B.

910: If the MIC is successfully validated, the anchor RAN node 510 may decide to relocate the anchor role to the current serving RAN node 530.

911: The anchor RAN node 510 returns a UE context 512 retrieval response to the serving RAN node 530 that may include any or all of:

RRC configuration information provided to the UE 202 by the anchor RAN node 510 (e.g. rrcConfig1);

UE 202 capabilities (e.g. ueCapabilities) previously determined by the anchor RAN node 510 (e.g. supported cryptographic algorithms);

UE 202 security association information (e.g. current NCC and $K_{eNB}^*/K_{gNB}^*$).

912-919: The UE context 512 returned by the anchor RAN node 510 is an indication to the serving RAN node 530 that it should assume the role of anchor RAN node for UE 202. Similar to steps 711-718 of FIGS. 7A-7C, the serving RAN node 530 establishes a new set of temporal cryptographic keys and configures the UE 202 for operation with the serving—now new anchor—RAN node.

Reception of a resume command at step 913 rather than a location notification response is an indication to the UE 202 that it is being returned to the CONNECTED mode for possible reconfiguration in a new anchor RAN node.

If necessary, the new anchor RAN node 530 can return the UE 202 to the INACTIVE mode at a later time.

Method Actions

Figure 10:
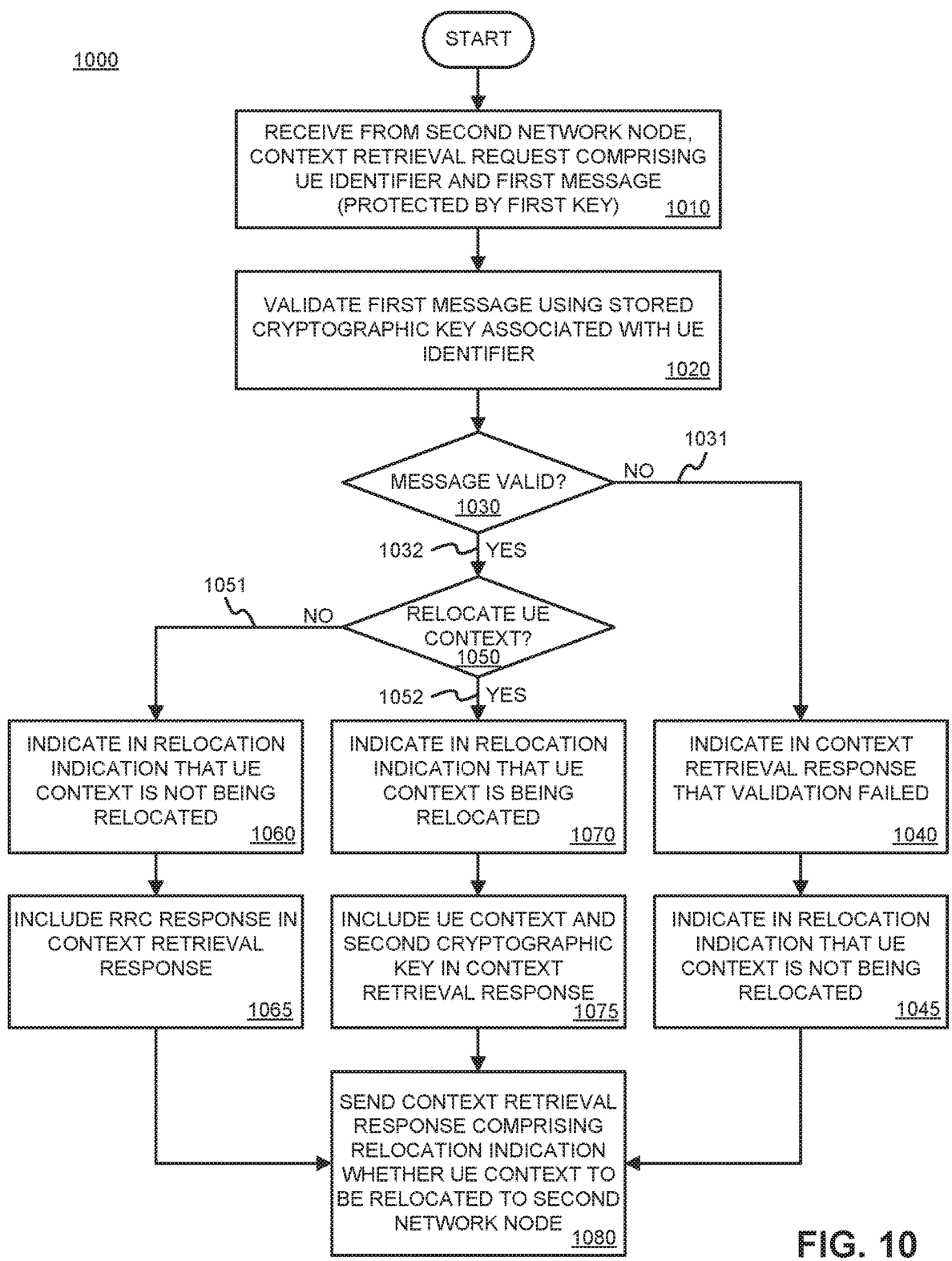
FIG. 10 is a flow chart showing method actions according to an example.

Turning now to FIG. 10, there is shown a flow chart, shown generally at 1000, showing example actions taken by a network node of a RAN for managing a context of a UE operating in an inactive mode.

One example action 1010 is to receive, from a second network node, a context retrieval request comprising a UE identifier and a first message, the first message being protected with a first cryptographic key.

One example action 1020 is to validate the first message using a stored cryptographic key associated with a UE context indicated by the UE identifier.

The result of the validation action 1020 may be considered in decision 1030. If the message is not valid 1031, then processing proceeds to action 1040. If the message is valid 1032, then processing proceeds to decision 1050.

In some non-limiting examples, one example action 1040 may be to indicate, by the context retrieval response, that a determination has been made that the first message is not valid.

In some non-limiting examples, one example action 1045 may be to indicate, by the relocation indication, that a determination has been made not to relocate the UE context.

In some non-limiting examples, a determination whether or not to relocate the UE context may be made at decision 1050. If the determination is not to relocate the UE context 1051, then processing proceeds to action 1060. If the determination is to relocate the UE context 1052, then processing proceeds to action 1070.

In some non-limiting examples, one example action 1060 may be to indicate, by the relocation indication, that a determination has been made not to relocate the UE context.

In some non-limiting examples, one example action 1065 may be to include a RRC response in the context retrieval response.

In some non-limiting examples, one example action 1070 may be to indicate, by the relocation indication, that a determination has been made to relocate the UE context.

In some non-limiting examples, one example action 1075 may be to include the UE context and a second cryptographic key in the context retrieval response.

One example action 1080 may be to send a context retrieval response to the second network node, the context retrieval response containing the relocation indication of whether the UE context is to be relocated to the second network node.

Figure 11:
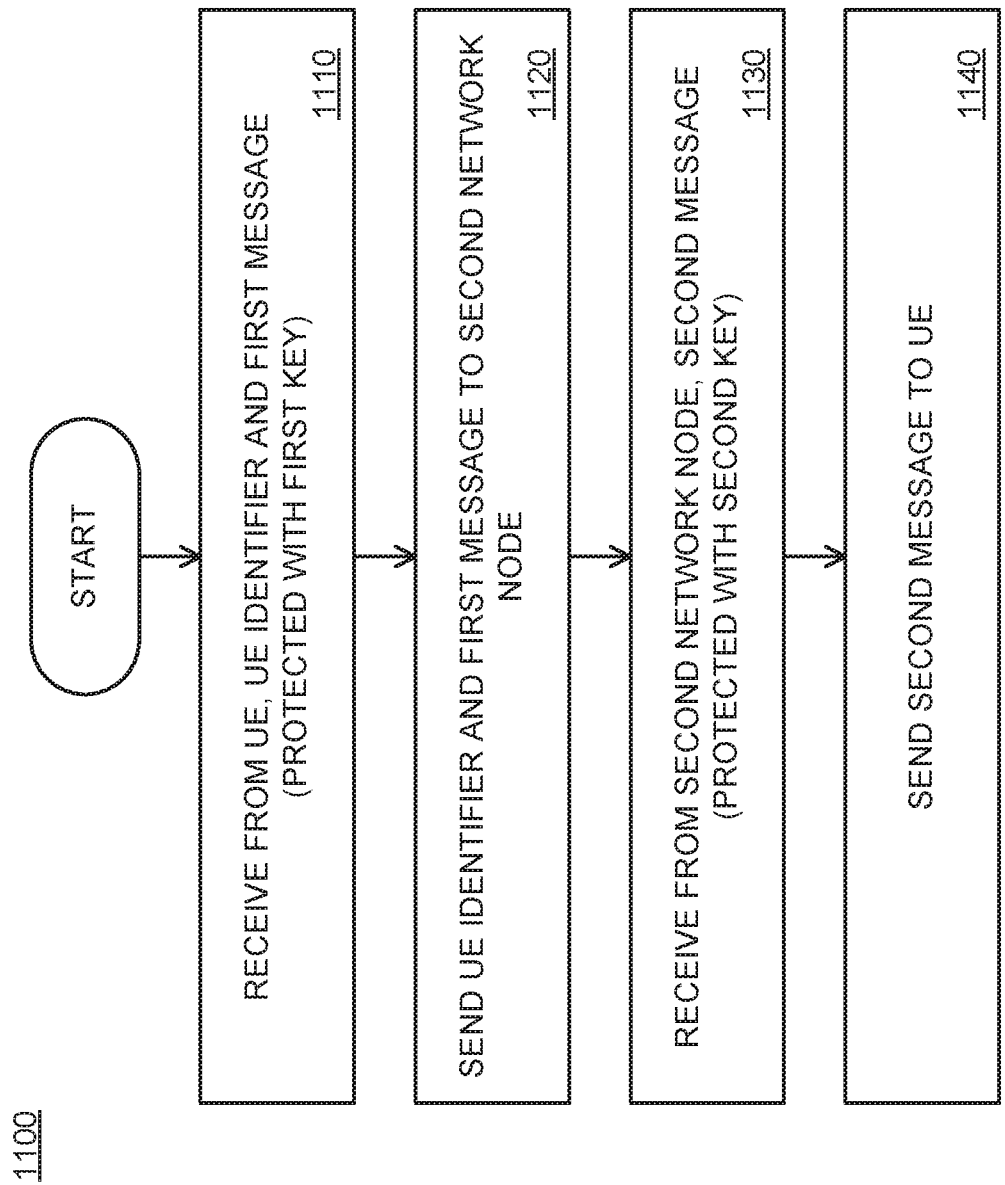
FIG. 11 is a flow chart showing method actions according to an example.

Turning now to FIG. 11, there is shown a flow chart, shown generally at 1100, showing example actions taken by a network node of a RAN for managing a context of a UE operating in an inactive mode.

One example action 1110 is to receive, from the UE, a UE identifier and a first message, the first message being protected with a first cryptographic key.

One example action 1120 is to send the UE identifier and the first message to a second network node.

One example action 1130 is to receive, from the second network node, a second message protected with a second cryptographic key.

One example action 1140 is to send the second message to the UE.

Figure 12:
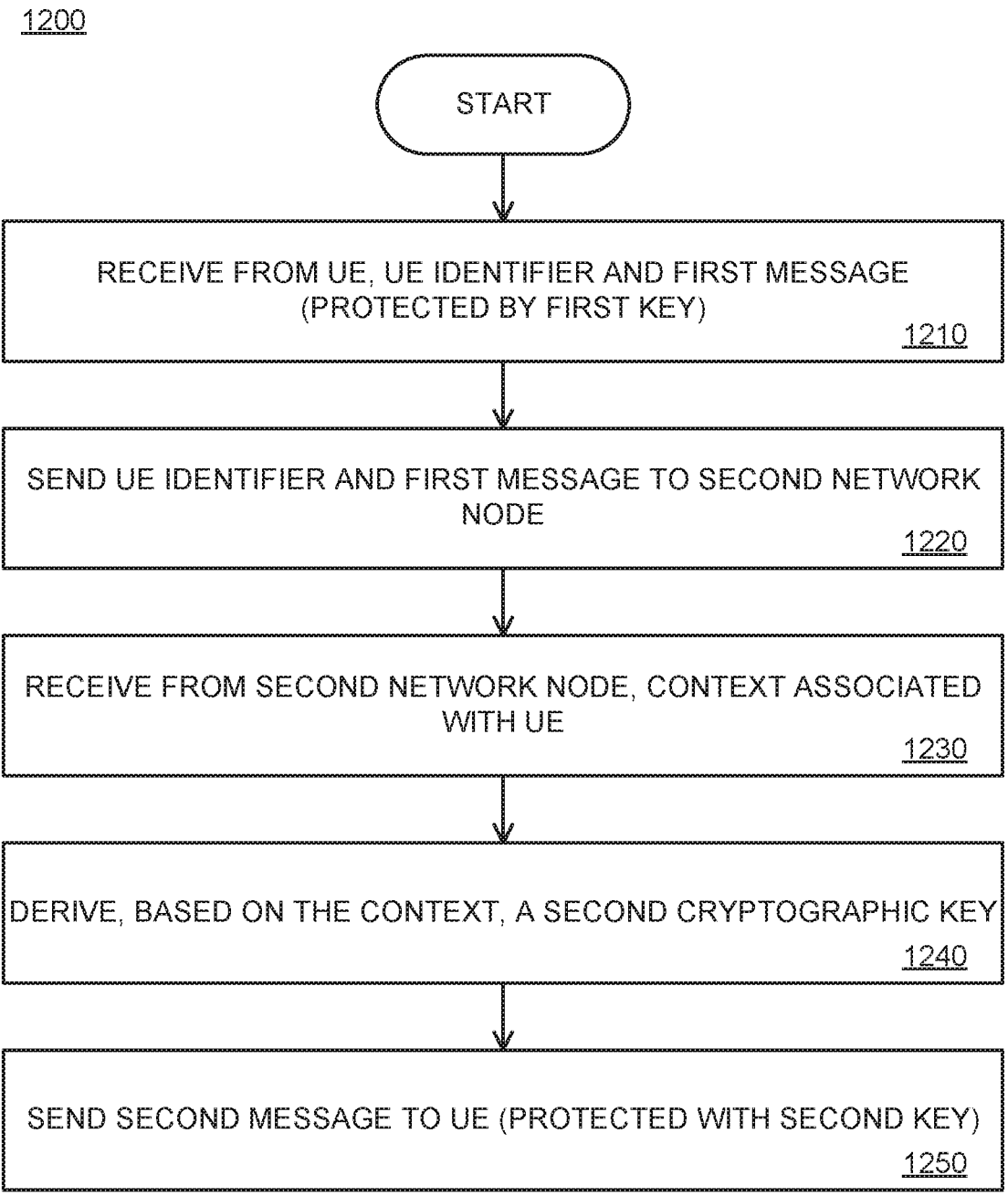
FIG. 12 is a flow chart showing method actions according to an example.

Turning now to FIG. 12, there is shown a flow chart, shown generally at 1200, showing example actions taken by a network node of a RAN for managing a context of a UE operating in an inactive mode One example action 1210 is to receive, from the UE, a UE identifier and a first message, the first message being protected with a first cryptographic key.

One example action 1220 is to send the UE identifier and the first message to a second network node.

One example action 1230 is to receive, from the second network node, a context associated with the UE.

One example action 1240 is to derive, based on the context, a second cryptographic key.

One example action 1250 is to send a second message to the UE protected with the second cryptographic key.

Accordingly, a first aspect of the present disclosure provides a method at a network node of a RAN for managing a context of a UE operating in an INACTIVE mode, the method comprising: receiving, from a second network node, a context retrieval request comprising a UE identifier and a first message, the first message being protected with a first cryptographic key; validating the first message using a stored cryptographic key associated with a UE context indicated by the UE identifier; and sending a context retrieval response message to the second network node, the context retrieval response message containing a relocation indication of whether the UE context is to be relocated to the second network node.

A further aspect of the present disclosure provides a method at a network node of a RAN for managing a context of a UE operating in an INACTIVE mode, the method comprising: receiving, from the UE, a UE identifier and a first message protected with a first cryptographic key; sending the UE identifier and the first message to a second network node; receiving, from the second network node, a second message protected with a second cryptographic key; and sending the second message to the UE.

A further aspect of the present disclosure provides a method at a network node of a RAN for managing a context of a UE operating in an INACTIVE mode, the method comprising: receiving, from the UE, a UE identifier and a first message protected with a first cryptographic key; sending the UE identifier and the first message to a second network node; receiving, from the second network node, a context associated with the UE; deriving, based on the context, a second cryptographic key; and sending a second message to the UE protected with the second cryptographic key.

Accordingly, an aspect of the present disclosure provides a method at a network node of a radio access network (RAN) for managing a UE context of a user equipment (UE) operating in the INACTIVE mode, the method comprising: receiving, from a second network node, a context retrieval request comprising a user equipment identifier and a first message protected with a first cryptographic key; and sending a context retrieval response message to the second network node, the context retrieval response message containing an indication of whether the UE context is to be relocated to the second network node.

In an embodiment, the sending the context retrieval response if performed can be responsive to validating the first message in accordance with the first cryptographic key. In an embodiment, the sending of the context retrieval response can be performed responsive to a determination of whether to relocate the UE context to the second network node. In an embodiment, the network node can be an anchor node associated with the user equipment.

A further aspect of the present disclosure provides an anchor node of a radio access network (RAN), the anchor node comprising: at least one processor; and non-transitory computer readable software instructions configured to control the at least one processor to implement a method for managing a UE context of a user equipment (UE) operating in the INACTIVE mode, the method comprising: receiving, from a second network node, a context retrieval request comprising a user equipment identifier and a first message protected with a first cryptographic key; and sending a context retrieval response message to the second network node, the context retrieval response message containing an indication of whether the UE context is to be relocated to the second network node.

A further aspect of the present disclosure provides a method at a network node of a radio access network (RAN) for managing a UE context of a user equipment (UE) operating in the INACTIVE mode, the method comprising: receiving, from the UE, a UE identifier and a first message protected with a first cryptographic key; identifying, based on the UE identifier, a second network node; sending the UE identifier and the first message to the second network node; receiving, from the second network node, a second message protected with a second cryptographic key; and sending the second message to the UE.

In an embodiment, the second network node can be determined in accordance with the UE identifier. In an embodiment, the second message can comprise at least one of: an identifier to be used by the UE for further operations in the inactive mode; an indication of the RAN notification area where the UE can receive service while operating in the inactive mode; and a maximum time between location notifications initiated by the UE. In an embodiment, the network node can be a serving node associated with the user equipment.

A further aspect of the present disclosure provides a serving node of a radio access network (RAN), the anchor node comprising: at least one processor; and non-transitory computer readable software instructions configured to control the at least one processor to implement a method for managing a UE context of a user equipment (UE) operating in the INACTIVE mode, the method comprising: receiving, from the UE, a UE identifier and a first message protected with a first cryptographic key; identifying, based on the UE identifier, a second network node; sending the UE identifier and the first message to the second network node; receiving, from the second network node, a second message protected with a second cryptographic key; and sending the second message to the UE.

A further aspect of the present disclosure provides a method at a network node of a radio access network (RAN) for managing a UE context of a user equipment (UE) operating in the INACTIVE mode, the method comprising: receiving, from the UE, a UE identifier and a first message protected with a first cryptographic key; identifying, based on the UE identifier, a second network node; sending the UE identifier and the first message to the second network node; receiving, from the second network node, a context associated with the UE; deriving, based on the context, a second cryptographic key; and sending a second message to the UE protected with the second cryptographic key.

In an embodiment, the second network node can be determined in accordance with the UE identifier. In an embodiment, the second cryptographic key can be determined in accordance with the context associated with the UE. In an embodiment, the network node can be a serving node associated with the UE. In an embodiment, the second message can comprise any one or more of: an identifier to be used by the UE for further operations in the inactive mode; an indication of the RAN notification area where the UE can receive service while operating in the inactive mode; and a maximum time between location notifications initiated by the UE.

A further aspect of the present disclosure provides a serving node of a radio access network (RAN), the anchor node comprising: at least one processor; and non-transitory computer readable software instructions configured to control the at least one processor to implement a method for managing a UE context of a user equipment (UE) operating in the INACTIVE mode, the method comprising: receiving, from the UE, a UE identifier and a first message protected with a first cryptographic key; identifying, based on the UE identifier, a second network node; sending the UE identifier and the first message to the second network node; receiving, from the second network node, a context associated with the UE; deriving, based on the context, a second cryptographic key; and sending a second message to the UE protected with the second cryptographic key.

Although the present disclosure has been described with reference to specific features and examples thereof, it is evident that various modifications and combinations can be made thereto without departing from the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

We claim:

1. A serving node of a radio access network (RAN), the serving node comprising:
   a radio interface;
   a network interface;
   a processor; and
   a non-transitory memory storing instructions that when executed by the processor cause the serving node to:
   receive, using the radio interface, from a user equipment (UE) operating in an inactive mode, an identifier of the UE and a first message, the first message being protected with a first cryptographic key wherein the first cryptographic key is associated with a second network node of the RAN;
   send, using the network interface, to the second network node, a UE context retrieval request, the UE context retrieval request including the identifier of the UE and the first message;
   receive, using the network interface, from the second network node, a UE context retrieval response, the UE context retrieval response including a relocation indication of whether a UE context is to be relocated to the serving node, wherein when the relocation indication indicates that the UE context is not relocated to the serving node, the UE context retrieval response includes a second message protected with a second cryptographic key wherein the second cryptographic key is associated with the second network node; and
   send, using the radio interface, the second message to the UE.

2. The serving node as claimed in claim 1 wherein the second network node is determined in accordance with the identifier of the UE.

3. The serving node as claimed in claim 1, wherein the second message comprises at least one of:
   an identifier to be used by the UE for further operations in the inactive mode;
   an indication of a RAN notification area (RNA) where the UE can receive service while operating in the inactive mode; and
   a maximum time between location notifications initiated by the UE.

4. A serving node of a radio access network (RAN), the serving node comprising a memory and at least one processor configured to:
   a radio interface; a network interface; a processor; and
   a non-transitory memory storing instructions that when executed by the processor cause the serving node to:
   receive, using the radio interface, from a user equipment (UE) operating in an inactive mode, an identifier of the UE and a first message, the first message being protected with a first cryptographic key wherein the first cryptographic key is associated with a second network node of the RAN;
   send, using the network interface, to the second network node, a UE context retrieval request, the UE context retrieval request including the identifier of the UE and the first message;
   receive, using the network interface, from the second network node, a UE context retrieval response, the UE context retrieval response including a relocation indication that the UE context is relocated to the serving node and a context associated with the UE;
   derive, based on the received UE context, a second cryptographic key wherein the second cryptographic key is associated with the serving node; and
   send, using the radio interface, a second message to the UE protected with the second cryptographic key.

5. The serving node as claimed in claim 4 wherein the second network node is determined in accordance with the identifier of the UE.

6. The serving node as claimed in claim 4, wherein the second message comprises any one or more of:
   an identifier to be used by the UE for further operations in the inactive mode;
   an indication of a RAN notification area (RNA) where the UE can receive service while operating in the inactive mode; and
   a maximum time between location notifications initiated by the UE.

7. A method at a network node of a radio access network (RAN) for managing a UE context of a user equipment (UE) operating in an inactive mode, the method comprising:
   receiving, from the UE, a UE identifier and a first message, the first message being protected with a first cryptographic key wherein the first cryptographic key is associated with a second network node of the RAN;
   sending, to the second network node, a UE context retrieval request, the UE context retrieval request including the UE identifier and the first message; and
   receiving, from the second network node, a UE context retrieval response, the UE context retrieval response containing a relocation indication of whether a UE context is to be relocated to the network node, wherein one the following holds;

when the relocation indication indicates that the UE context Is not relocated to the network node, the method further comprises: receiving, in the UE context retrieval response, a second message protected with a second cryptographic key, the second cryptographic key being associated with the second network node; and sending the second message to the UE; and when the relocation indication indicates that the UE context is relocated to the network node, the UE context retrieval response includes a UE context associated with the UE, and the method further includes: using the UE context by the network node to derive a further cryptographic key wherein the further cryptographic key is associated with the network node; and sending a second message to the UE wherein the second message is protected using the further cryptographic key.

8. The method of claim 7 wherein the second network node is determined in accordance with the UE identifier.

9. The method of claim 7 wherein the second message comprises any one or more of:
- an identifier to be used by the UE for further operations in the inactive mode;
- an indication of a RAN notification area (RNA) where the UE can receive service while operating in the inactive mode; and
- a maximum time between location notifications initiated by the UE.

10. The method of claim 7 wherein the second message is a radio resource control (RRC) message.

11. The method of claim 7 wherein the network node is a new serving node associated with the UE.

12. The method of claim 7 wherein the second network node is an old anchor node associated with the UE.

* * * * *